United States Patent [19]

Tsuda et al.

[11] Patent Number: 5,076,672
[45] Date of Patent: Dec. 31, 1991

[54] ALL-OPTICAL SWITCH APPARATUS USING A NONLINEAR ETALON

[75] Inventors: Hiroyuki Tsuda, Zama; Takashi Kurokawa, Urawa; Koji Nonaka, Zama, all of Japan

[73] Assignee: Nippon Telegraph & Telephone Corporation, Tokyo, Japan

[21] Appl. No.: 409,044

[22] Filed: Sep. 18, 1989

[30] Foreign Application Priority Data

Sep. 20, 1988 [JP] Japan .................... 63-233485
Jan. 12, 1989 [JP] Japan ...................... 1-3838
Jun. 5, 1989 [JP] Japan ................... 1-142643

[51] Int. Cl.$^5$ ........................... G02B 5/23; G02F 1/01
[52] U.S. Cl. ............................................... 359/244
[58] Field of Search ............. 350/354, 356, 385, 386, 350/393, 354, 356; 364/713

[56] References Cited

U.S. PATENT DOCUMENTS

| 4,630,898 | 12/1986 | Jewell | 350/354 |
| 4,701,030 | 10/1987 | Jewell | 350/354 |
| 4,854,676 | 8/1989 | Kalyanaraman | 350/354 |

FOREIGN PATENT DOCUMENTS 60-108824 6/1985 Japan.
62-269125 11/1987 Japan.

OTHER PUBLICATIONS

"All-Optical Flip-Flop Operation in an Optical Bistable Device Using Two Lights of Different Frequencies", K. Inoue: Optics Letters, vol. 12, No. 11, Nov. 1987, pp. 918-920.
"Applications of the Selfoc Micro Lens to Micro-Optic Devices", Selfoc Handbook, NSG America/Nippon Sheet Glass Co., Ltd., Chap. 4, pp. 80-82.
"Purely Optical Discrete Logic Elements Based on Bistable Thin-Film Interferometers", Soviet Journal of Quantum Electronics, vol. 17, No. 13, Mar. 1987, pp. 328-332, American Institute of Physics, New York, N.Y., G. V. Sinitsyn.
Masseboeuf et al., Low-Power Optical Bistablity in a Thermally Stable AlGaAs Etalon, Feb. 14, 1989, pp. 2290-2292.
Janossy et al., Thermally Induced Optical Bistability in Thin Film Devices, vol. QE-21, pp. 1337-1452, (IEEE Journal of Quantum Electronics).
Buller et al., Optically Bistable Nonlinear Interference Filters for Use with Near-Infrared Laser Diodes, vol. 70, No. 6, Optics Communications, Apr. 15, 1989, pp. 522-528.
Nonaka et al., Thermal Optical Bistability in InGaAs-/InAlAs MQWE Etalons at 1.5 $\mu$m Wavelength, (IEEE Photonics Technology Letters, vol. 1, No. 3, Mar. 1989, pp. 54-58.
Yumoto et al., Observation of Optical Bistability in $CdS_xSe_{1-x}$ Doped Glasses with 25-psec Switching Time, Optics Letters, vol. 12, p. 832, Oct. 1987.

Primary Examiner—Rolf Hille
Assistant Examiner—Mahshid Saadat
Attorney, Agent, or Firm—Frishauf, Holtz, Goodman & Woodward

[57] ABSTRACT

An all-optical swtich apparatus having an optical gate which is unitarily composed of a nonlinear etalon and a pair of GRIN lenses, or a nonlinear etalon and a GRIN lens, and having collimating GRIN lenses, each of which guides a signal beam and a control beam to the optical gate. The resonance wavelength of the etalon can be regulated by adjusting the incident positions of signal beam and/or control beam to the optical gate by moving the collimating GRIN lenses. This decreases the required thickness accuracy of the etalon by one or more orders of magnitude than in the conventional technique. Three major types of switches are disclosed: a primary type in which the signal beam is switched by changing the transmittance of the etalon by the control beam; a reflecting type which works as a complementary switch of the primary type; and a transfer type in which the direction of travel of the signal beam is changed by emitting either the transmitted signal beam or the reflected signal beam from the optical gate under the control of the control beam.

20 Claims, 23 Drawing Sheets

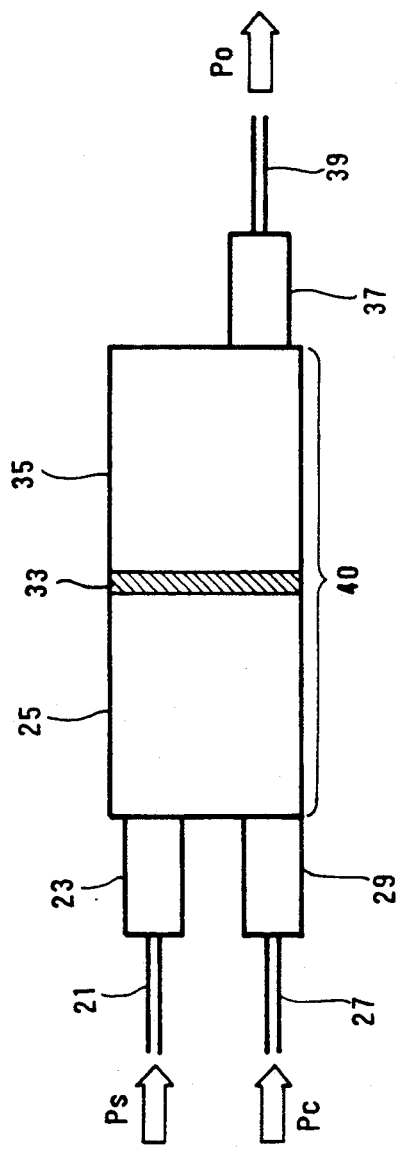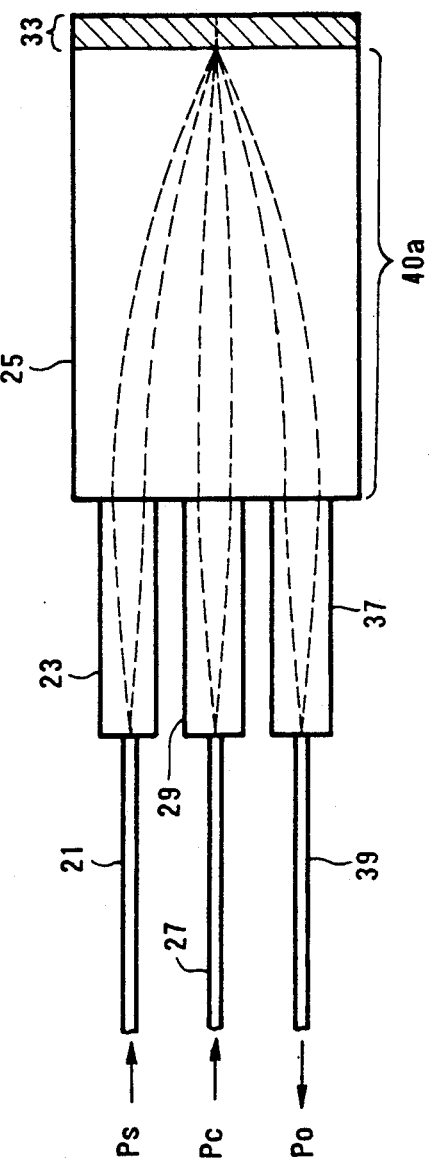

ALL-OPTICAL SWITCH APPARATUS USING A NONLINEAR ETALON

BACKGROUND OF THE INVENTION

1. Field of the Invention

The present invention relates to an all-optical switch apparatus using a nonlinear etalon in which a control beam turns a signal beam on and off, or switches the direction of the signal beam.

2. Prior Art

One of the simplest of conventional optical switches is shown in FIG. 1. This optical switch, employing an electronic circuit that controls a signal beam by means of an electric signal, first converts signal beam Ps into an electric signal by means of photodiode 1, and then modulates, switches, or amplifies the electric signal by electric circuit 2, and finally converts the electric signal into an optical beam by means of laser diode 3, producing the optical beam as output beam Po.

Another conventional optical switch, which switches the traveling direction of the signal beam, is shown in FIG. 2. This switch detects signal beam Ps by means of photodetector 1, such as a photodiode, converts the signal beam Ps into an electric signal, amplifies the electric signal by means of electric circuit 2, and selectively drives diode laser 5 or 6 according to the electric signal and control voltage Vc. Thus, input signal beam Ps is outputted from first waveguide 8a or second waveguide 8b.

Another switch that switches the direction of the signal beam is shown in FIG. 3. It uses optical directional coupler 7, and has input signal beam Ps selectively emitted from first waveguide 8a or second waveguide 8b according to the applied control voltage Vc.

Furthermore, other types of switches can be employed. Among these, are electrically controlled switches using waveguides made of materials (such as lithium niobate, gallium arsenide, YIG) exhibiting electro-optical effects, or materials exhibiting acousto-optical effects, magneto-optical effects, or thermooptical effects.

These optical switches turn on and off by changing the state of the optical switching material, or by changing the refractive index or the absorption coefficient thereof by controlling the voltage or current. The switching speed of these types of switches is restricted by the bandwidth of the electric circuit as well as by the response time of the materials used in the switch, which impose an undue limit on the bandwidth of the light. In addition, a wideband electronic circuit is required, which places an additional demand on the electronic circuit.

For these reasons, an all-optical switch, utilizing a nonlinear optical material and controlled by an optical beam, is required for high-speed switching. A nonlinear etalon (Fabry-Perot etalon) is a promising type of basic switching element for all-optical switches which can utilize the properties of nonlinear optical materials.

Nonlinear etalons have a pair of mirrors between which a nonlinear optical material is inserted, and have a sharp resonance transmission peak at a wavelength corresponding to the light-pass length between the mirrors. The optical resonator length of the etalon varies with the intensity of incident light because the refractive index of the nonlinear medium changes in response to an increase or a decrease in the intensity of incident light. Consequently, the nonlinear etalon has a nonlinear input-output characteristic corresponding to the operational detuning around the resonance wavelength. The operational detuning is defined as the difference between the resonance wavelength of the etalon and the wavelength of incident light. Optical switching can be achieved by using the above characteristic. Nonlinear etalons themselves are well known, and many papers describing them have been published. The major results of these papers are covered in the book by H.M. Gibbs entitled "Optical bistability: controlling light with light" (Academic Press, New York, 1985).

Conventional optical switches employing nonlinear etalons, however, have several disadvantages that prevent practical use. The following are some of the problems of conventional optical switches using nonlinear etalons:

(1) FIG. 4 shows an optical switch that combines signal beam Ps and control beam Pc by means of prism 10, inputs the beams normally to nonlinear etalon 12 via lens 11, and emits the output light of nonlinear etalon 12 through lens 13. The optical switch presents the following problems:

(1a) The operational detuning of nonlinear etalon 12 must be specified to an accuracy better than $10^{-1}$ of the full width at half maximum (FWHM) to obtain a desired input-output characteristic of nonlinear etalon 12. The operational detuning, as mentioned above, is the difference between the wavelength of incident light and the wavelength at the center of a resonant peak of etalon 12. Let us consider the case where the resonance wavelength of etalon 12 is specified according to the wavelength of a beam produced from a given optical source. As a typical case, assuming that the wavelength of the beam from the optical source is 1 μm, and a full width at half maximum (FWHM) of etalon 12 is about 1 nm, then the accuracy of the thickness required of the nonlinear medium of etalon 12 must be better than $10^{-4}$. The current technique cannot achieve such a high accuracy with a high yield. This problem has not yet been solved, and recent reports such as "Low-power optical bistability in a thermally stable AlGaAs etalon" by E. Masseboeuf, et al. (Appl. Phys. Lett. 54(23), pp. 2290–2292, 5 June 1989) describes a method for adjusting operational detuning by modifying the wavelength of light by using a light source of variable wavelength such as a dye laser. However, selecting a light source according to a switch is obviously impractical.

(1b) The arrangement in FIG. 4 employs individual components such as lenses 11 and 12, prism 10, and nonlinear etalon 12, which are not assembled into one unit. As a result, the adjustment of the alignment is difficult. In addition, high reliability after adjustment cannot be ensured.

(1c) A high on/off ratio of switching cannot be obtained, because signal beam Ps and control beam Pc are not separated, which is particularly true when signal beam Ps is weak.

(2) FIG. 5 shows an arrangement in which signal beam Ps and control beam Pc are obliquely inputted to nonlinear etalon 12 through lenses 15 and 16, so that the operational detuning of nonlinear etalon 12 is adjusted by the angle of incidence, and the output beam from the etalon is emitted through lens 18 as output beam Po. Such an arrangement is described, for example, in "Thermally induced optical bistability in thin film devices" by I. Janossy, et al. (IEEE Journal of Quantum Electronics, Vol. QE-21, pp. 1447–1452, 1985), in which the operational detuning is adjusted by means of the angle of incidence. However, this method presents the following problems:

(2a) Adjustment of the incident angle is difficult while maintaining the focal point of beams Ps and Pc on etalon 12. In particular, it is difficult to maintain optical fibers (guiding signal beam Ps and control beam Pc), lenses 15 and 16, and nonlinear etalon 12 in coupling arrangement.

(2b) The focal lengths of lenses 15 and 16 must be long owing to their sizes. As a result, the spot sizes of beams Ps and Pc on etalon 12 must be relatively large, and therefore the intensity of light in the spot is low, and so the beam intensity must be increased.

(3) U.S. Pat. No. 4,630,898 entitled "Etalon optical logic gate apparatus and method" describes logic-arithmetic elements using a etalon. The logic gate disclosed employs control beams (input beams) and a signal beam (probe beam), and changes the transmittance and reflectance of the etalon by means of control beams in order to control the passing of the signal beam through the etalon to perform a logical operation. In this case, the wavelengths of the control beams and that of the signal beam are different: the wavelengths of the control beams are such that the wavelengths can alter the transmittance and reflectance of the etalon; whereas the wavelength of the signal beam is such that the wavelength does not substantially alter the transmittance and reflectance of the etalon. In addition, the wavelengths of control beams are rather apart from the wavelength of the resonant peak of the etalon. Disadvantages of the apparatus and method are as follows:

(3a) As described in (1a) above, the operational detuning of nonlinear etalon 12 must be specified with an accuracy greater than $10^{-1}$ of full width at half maximum (FWHM) to obtain a desired input-output characteristic thereof (the operational detuning of nonlinear etalon corresponds to the difference between the resonance wavelength of etalon and that of the probe beam in the U.S. Pat. No. 4,630,898). In a typical case, the thickness accuracy required of the nonlinear medium of nonlinear etalon 12 must be greater than $10^{-4}$, as described above. The current technology cannot achieve such a high accuracy with a high yield.

(3b) As described in (1b) above, the arrangement in FIG. 1 in U.S. Pat. No. 4,630,898 employs individual components, such as lenses, a polarizing cube, a nonlinear etalon, etc., which are not assembled into one unit. As a result, the adjustment of the arrangement is difficult. In addition, high reliability after adjustment cannot be ensured.

SUMMARY OF THE INVENTION

It is therefore an object of the invention to provide an all-optical switch of an arrangement that does not require high operational detuning accuracy, so that the thickness accuracy required of the etalon can be lowered, and the production yield of the etalon can be increased.

It is another object of the invention to provide an all-optical switch that can switch a signal beam so as to separate from a control beam.

It is a further object of the invention to provide an all-optical switch which is simple to adjust and of high reliability by assembling the components thereof into one unit.

It is another object of the invention to provide an all-optical switch of high efficiency that can decrease the intensity of incident light required for the functioning of the nonlinear etalon.

It is another object of the invention to provide an all-optical switch that can switch a wideband signal beam by taking advantage of the high-speed and wideband characteristics of light.

In a first aspect of the present invention, there is provided an all-optical switch apparatus using a nonlinear etalon, the all-optical switch turning a signal beam on and off under the control of a control beam, the all-optical switch comprising:

optical gate means having a nonlinear etalon and a pair of lensing means attached to each surface of the etalon, the etalon having a nonlinear relationship between incident light intensity and transmittance, each of the lensing means converging rays of light which are parallel to the axis of the lensing means and are incident on one end surface of the lensing means so that the rays of light converge on the center of the opposite end surface of the lensing means;

optical input means sending the signal beam and the control beam into the optical gate means in such a manner that the signal beam and the control beam are sent to different incident positions on one end surface of the optical gate means in a fashion parallel to the axis of the optical gate means;

optical output means separating the signal beam from the control beam using the difference in emitted positions of the signal beam and the control beam from the optical gate means, and emitting only the signal beam as the output beam.

In a second aspect of the present invention, there is provided an all-optical switch apparatus using a nonlinear etalon, the all-optical switch turning a signal beam on and off under the control of a control beam, the all-optical switch comprising:

optical gate means having a nonlinear etalon and lensing means attached to one surface of the etalon, the etalon having a nonlinear reflectance that changes in response to the intensity of incident light, the lensing means converging rays of light which are parallel to the axis of the lensing means and are incident on one end surface of the lensing means so that the rays of light converge on the center of the opposite end surface of the lensing means;

optical input means sending the signal beam and the control beam into the optical gate means in such a manner that the signal beam and the control beam are sent to different incident positions on one end surface of the optical gate means in a fashion parallel to the axis of the optical gate means;

optical output means separating the signal beam from the control beam, both of which are reflected by the nonlinear etalon and emitted from the optical gate means, by using the difference in emitted positions of the signal beam and the control beam from the optical gate means, and emitting only the separated signal beam as output beam.

In a third aspect of the present invention, there is provided an all-optical switch apparatus using a nonlinear etalon, the all-optical switch turning a signal beam on and off under the control of a control beam, the all-optical switch comprising:

optical gate means having a nonlinear etalon and a pair of lensing means attached to each surface of the etalon, the etalon having a nonlinear reflectance that changes in response to the intensity of incident light, each of the lensing means converging rays of light which are parallel to the axis of the lensing means and are incident on one end surface of the lensing means so that the rays of light converge on the center of the opposite end surface of the lensing means;

primary optical input means sending the signal beam onto one end surface of the optical gate means in a fashion parallel to the axis of the optical gate means;

secondary optical input means sending the control beam onto the other end surface of the optical gate means in a fashion parallel to the axis of the optical gate means; and optical output means separating the signal beam reflected by the nonlinear etalon and emitted from the optical gate means from the control beam transmitted through the nonlinear etalon and emitted from the optical gate means using the difference in emitted positions of the signal beam and the control beam from the optical gate means, and emitting only the separated signal beam as output beam.

In a fourth aspect of the present invention, there is provided an all-optical switch apparatus using a nonlinear etalon, the all-optical switch changing the direction of travel of a signal beam which is under the control of a control beam, the all-optical switch comprising:

optical gate means having a nonlinear etalon and a pair of lensing means attached to each surface of the etalon, the etalon having a transmittance and a reflectance that nonlinearly changes in response to the intensity of incident light, each of the lensing means converging rays of light which are parallel to the axis of the lensing means and are incident on one end surface of the lensing means so that the rays of light converge on the center of the opposite end surface of the lensing means;

optical input means sending the signal beam and the control beam into the optical gate means in such a manner that the signal beam and the control beam are sent to different incident positions on one end surface of the optical gate means in a fashion parallel to the axis of the optical gate means;

primary optical output means separating the signal beam from the control beam, both of which are transmitted through the nonlinear etalon and emitted from the optical gate means, by using the difference in emitted positions of the signal beam and the control beam from the optical gate means, and emitting only the separated signal beam as output beam; and secondary optical output means separating the signal beam from the control beam, both of which are reflected by the nonlinear etalon and emitted from the optical gate means, by using the difference in emitted positions of the signal beam and the control beam from the optical gate means, and emitting only the separated signal beam as output beam.

BRIEF DESCRIPTION OF THE DRAWINGS

FIG. 32 is a side view showing a configuration of a mirrorless-type all-optical switch according to embodiment 11 of the present invention;

FIG. 33 is a side view showing a configuration of a mirrorless-type all-optical switch according to embodiment 12 of the present invention;

DESCRIPTION OF THE PREFERRED EMBODIMENTS

The invention will now be described with reference to the accompanying drawings.

[1] EMBODIMENT 1 (PRIMARY TYPE 1)

Figure 1:
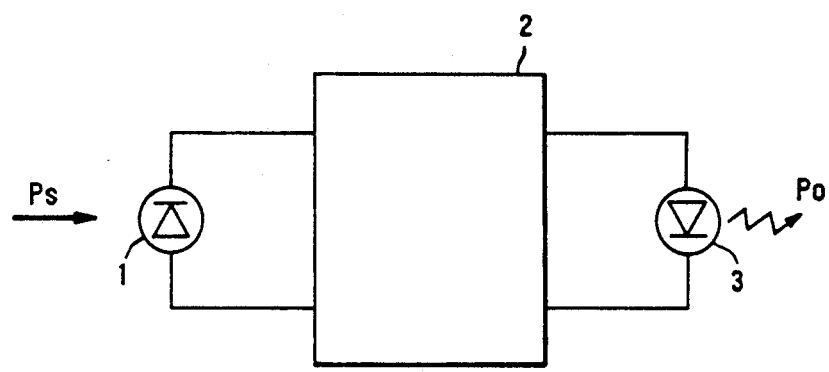
FIG. 1 is a view showing an example of a conventional on/off-type optical switch using a photoelectric converter and an electro-optic converter.
Figure 2:
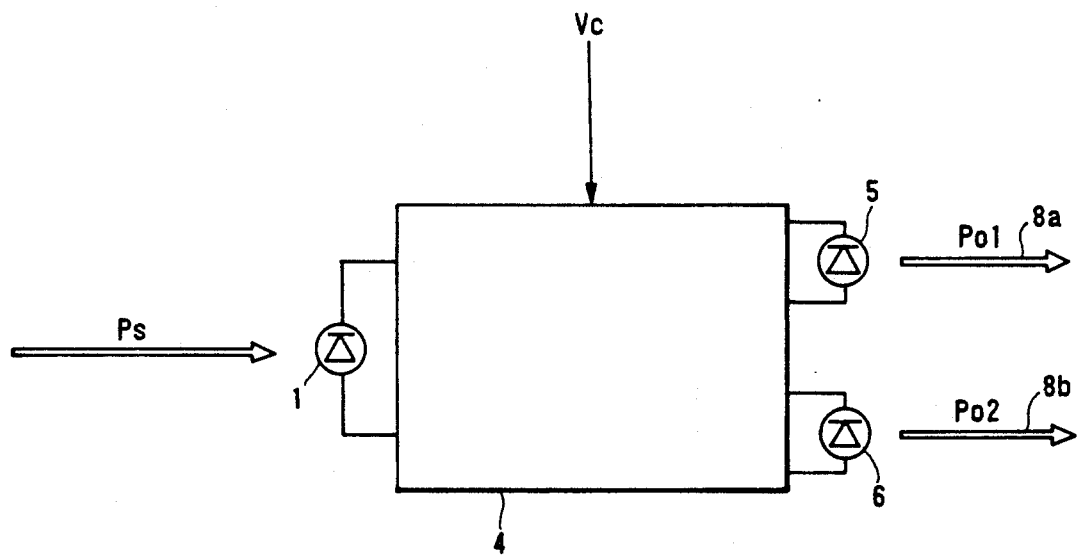
FIG. 2 is a view showing an example of a conventional transfer-type optical switch using a photoelectric converter and an electro-optic converter.
Figure 3:
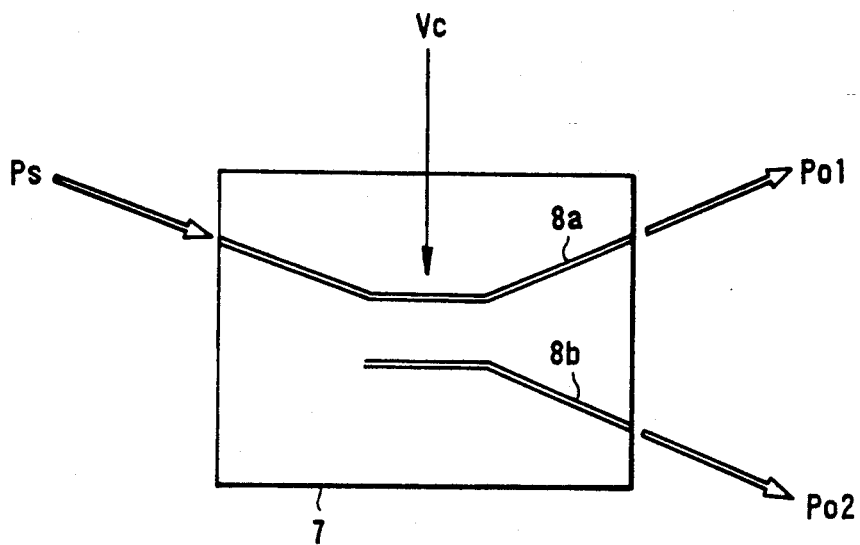
FIG. 3 is a view showing an example of a conventional transfer-type optical switch using an optical directional coupler.
Figure 4:
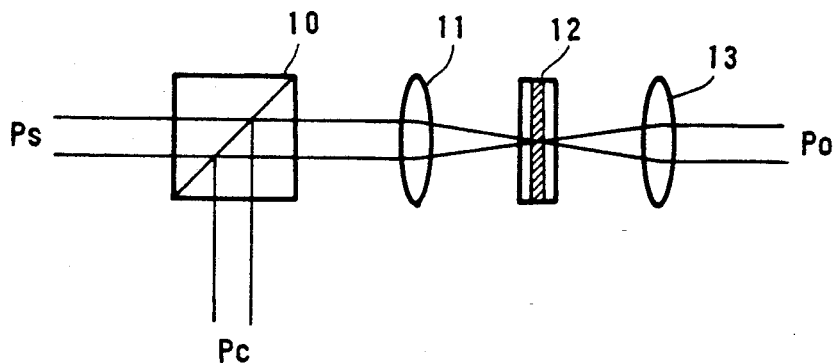
FIG. 4 is a view showing an example of a conventional optical switch using a nonlinear etalon.
Figure 5:
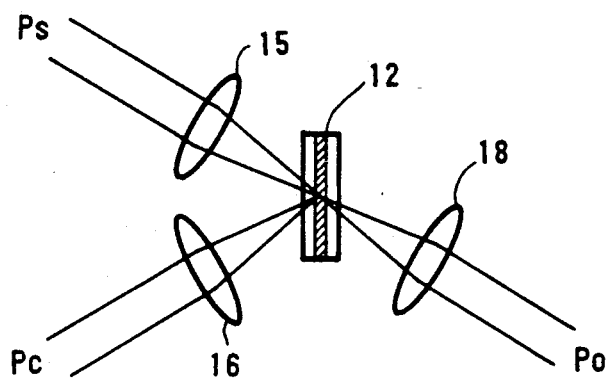
FIG. 5 is a view showing another example of a conventional optical switch using a nonlinear etalon.
Figure 6:
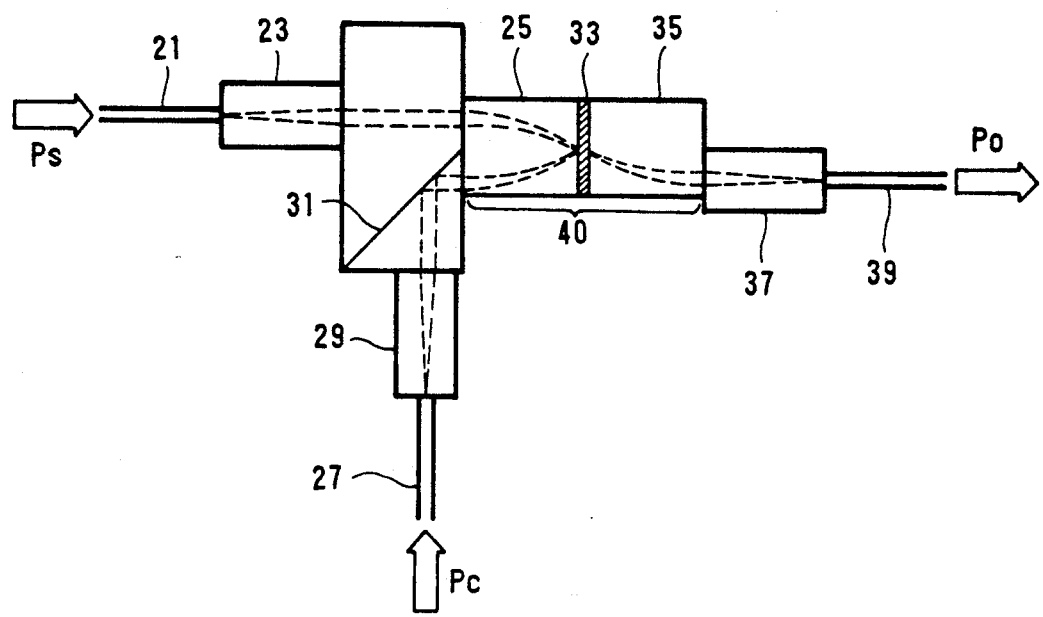
FIG. 6 is a side view showing a configuration of a primary-type all-optical switch according to embodiment 1 of the present invention.

FIG. 6 is a side view showing a configuration of a primary-type all-optical switch according to embodiment 1 of the present invention.

In FIG. 6, signal beam Ps travels through optical fiber 21 and is guided into collimating GRIN lens 23 which collimates rays of signal beam Ps to a collimated beam of a diameter of 100 μm (which is much smaller than the diameter of focusing GRIN lens 25), and sends the collimated beam to focusing GRIN lens 25 at the normal angle of incidence. Control beam Pc also travels through optical fiber 27 and is guided into collimating GRIN lens 29 which collimates control beam Pc to parallel rays of 100 μm diameter, and sends the parallel rays to focusing GRIN lens 25 at the normal angle of incidence via mirror 31.

The GRIN lens is a product of the Nippon Sheet Glass Corporation of Japan, and its name is an acronym for GRadient INdex lens. The GRIN lens has a gradient-index profile of a square distribution against its radius, and the two ends of the GRIN lens are made perpendicular to the axis. In addition, the GRIN lens has the length of ¼ pitch, which means that the light introduced into one end of the GRIN lens at the normal angle of incidence focuses on the center of the other end thereof, irrespective of the position of incidence. Sizes of these lenses are as follows: collimating GRIN lenses 23, 29 and 37 have a diameter of 1.8 mm and a length of 5 mm; while focusing GRIN lenses 25 and 35 have a diameter of 2 mm and a length of 5 mm.

Figure 8:
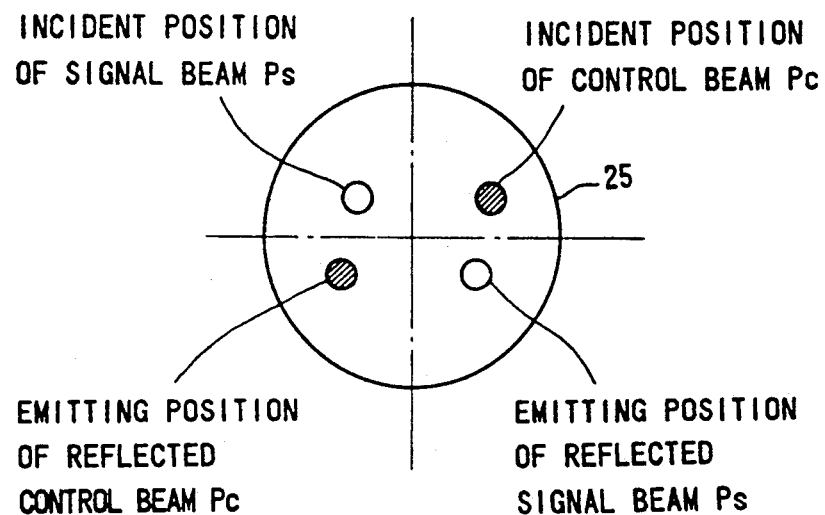
FIG. 8 is a sectional view showing the position of beam spots on the left-end surface of converging lens 25 of embodiment 1.

FIG. 8 shows spot locations at which signal beam Ps and control beam Pc are incident on the left-end surface of focusing GRIN lens 25. Since these beams Ps and Pc are incident at normal angles of incidence on the left-end surface of GRIN lens 25, they converge at the center of the right-end surface thereof, and are incident on nonlinear etalon 33. Nonlinear etalon 33 changes its transmission in response to the incident light intensity: when control beam Pc is incident at sufficient intensity, nonlinear etalon 33 permits transmission of signal beam Ps, while etalon 33 prevents the transmission of signal beam Ps when the incident intensity of control beam Pc is low. In short, nonlinear etalon 33 turns on and off in response to the intensity of control beam Pc. Signal beam Ps produced from nonlinear etalon 33 passes through focusing GRIN lens 35, and is separated from control beam Pc. Subsequently, the rays of signal beam Ps are incident to collimating GRIN lens 37, and are emitted from optical fiber 39 as output beam Po.

Figure 7:
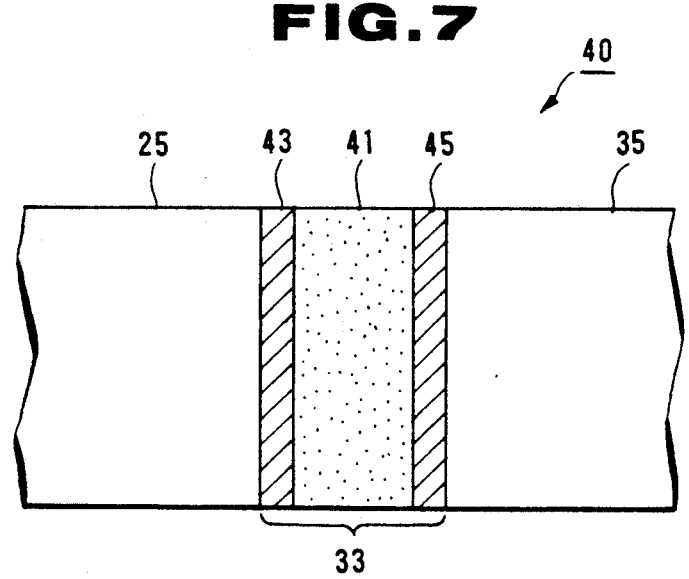
FIG. 7 is an enlarged view of an optical gate 40 consisting of nonlinear etalon 33, and converging lenses 25 and 35.

FIG. 7 is an enlarged view of an optical gate 40 consisting of nonlinear etalon 33, and focusing GRIN lenses 25 and 35. Nonlinear etalon 33, consisting of nonlinear medium 41 sandwiched between front mirror 43 and back mirror 45, is produced by the following processes: first, on the right-end surface of GRIN lens 25, mirror 43 is deposited, then nonlinear medium 41 and mirror 45 are sequentially deposited, and finally focusing GRIN lens 35 is bonded to mirror 45. More specifically, a ZnS layer 540 Å thick is deposted on one end surface of focusing GRIN lens 25, and then a layer of NaF·3AlF$_3$ 950 Å thick is deposited thereupon. This process is repeated four times to form mirror 43. After that, a ZnS layer of 8,580 Å thick is deposited to form nonlinear medium 41. In addition, a NaF·3AlF$_3$ layer 950 Å thick is deposited, and then a ZnS layer 540 Å thick is deposited. This process is repeated four times to form mirror 45. Finally, mirror 45 is bonded on the left-end surface of focusing GRIN lens 35 by an adhesive transparent to the wavelength of signal beam Ps. Thus, optical gate 40 is completed. The operation wavelength of signal beam Ps in this case is 514.5 nm.

Next, using optical gate 40 thus formed as the major component, the optical switch is constructed as follows:

(1) Optical gate 40 and mirror 31 are bonded as shown in FIG. 6, and are fixed on a supporting board.

(2) Three fiber collimators are provided: the first fiber collimator is unitarily composed of a collimating GRIN lens 23 and optical fiber 21; the second fiber collimator is unitarily composed of a collimating GRIN lens 29 and optical fiber 27; the third fiber collimator is unitarily composed of a collimating GRIN lens 37 and optical fiber 39. The fiber collimators are mounted in their positions, respectively, with 2-axis adjusting mechanisms. Thus, fine adjustment of the position of each fiber collimator (21, 23), (27, 29), or (37, 39) can be achieved in the plane normal to the axis of the fiber collimator.

(3) Control beam Pc is launched into optical fiber 27. It passes through collimating GRIN lens 29, is reflected by mirror 31, and is incident at the normal angle to the left-end surface of focusing GRIN lens 25. In this state, the fine adjustment of the incident position on the left-end surface is executed by monitoring the emitted control beam Pc from focusing GRIN lens 35, so that the predetermined level of the emitted control beam Pc can be obtained. After the adjustment, collimating GRIN lens 29 is fixed to the supporting board.

(4) Signal beam Ps is launched into optical fiber 21. It passes through collimating GRIN lens 23, and is normally incident to the left-end surface of focusing GRIN lens 25. In this state, the fine adjustment of the incident position on the left-end surface is executed by monitoring the emitted signal beam Ps from collimating GRIN lens 37, so that the maximum on/off ratio can be obtained. After the adjustment, collimating GRIN lens 23 is fixed to the supporting board.

The incident positions of signal beam Ps and control beam Pc are set so that these beams Ps and Pc are not aligned on a line passing through the axis.

(5) While signal beam Ps is incident, fine adjustment of the position of collimating GRIN lens 37 and optical fiber 39 is executed, so that the maximum coupling between input signal beam Ps and output signal beam Po is obtained. After the adjustment, collimating GRIN lens 37 is fixed to the supporting board.

Figure 9:
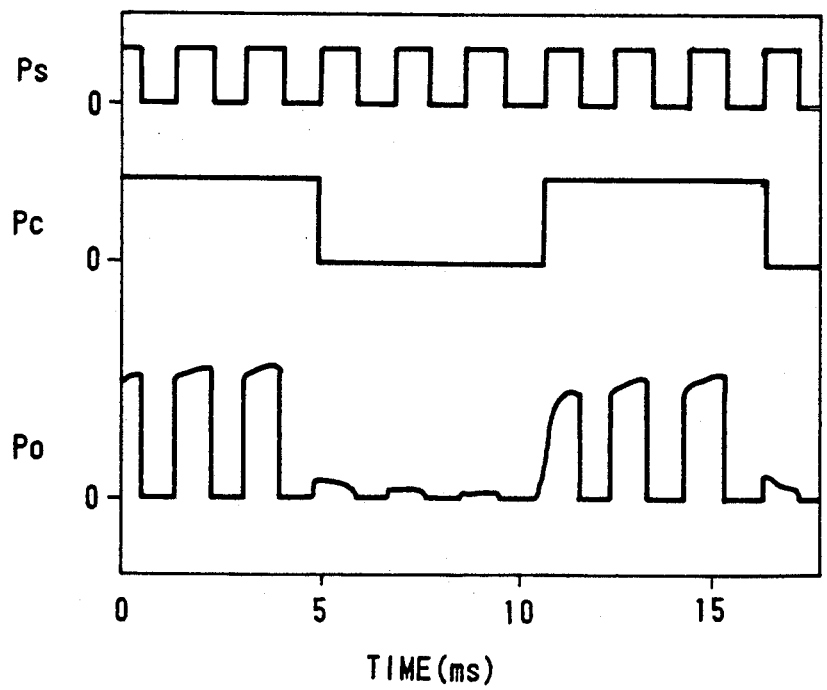
FIG. 9 is a timechart showing the operation of the all-optical switch of embodiment 1.

Operation of embodiment 1 will be explained with reference to FIG. 9. As mentioned above, this optical switch turns signal beam Ps on and off in response to the intensity of control beam Pc.

Signal beam Ps in the form of a pulse train, which is guided through optical fiber 21, and collimated to parallel rays of about 100 μm diameter by collimating GRIN lens 23, is normally incident on the left-end surface of focusing GRIN lens 25 and is focused on the center of the right-end surface thereof. On the other hand, control beam Pc, which is guided through optical fiber 27, collimated to parallel rays of about 100 μm diameter by collimating GRIN lens 29, and incident on mirror 31 from the direction perpendicular to the signal beam, is reflected by mirror 31 and is normally incident on the left-end surface of focusing GRIN lens 25, so that it is also focused on the center of the right-end surface thereof.

Thus, signal beam Ps and control beam Pc are incident on the left-end surface of focusing GRIN lens 25 at the positions shown in FIG. 8, and are entered onto the center of nonlinear etalon 33. When the intensity of incident control beam Pc is high, the total intensity of Ps+Pc is at a high level, so that nonlinear etalon 33 is transmissive. As a result, input signal beam Ps is transmitted through etalon 33 with little attenuation, and is incident to optical fiber 39 via focusing GRIN lens 35 and collimating GRIN lens 37, thus being emitted from optical fiber 39 as transmitted output beam Po. Control beam Pc, on the other hand, is emitted to the outside through another path in focusing GRIN lens 35.

In contrast, when control beam Pc is not incident, nonlinear etalon 33 is in a nontransmissive state, so that signal beam Ps is abruptly reflected, and is not transmitted through etalon 33. Thus, signal beam Ps is turned on and off by control beam Pc.

In this embodiment 1, which uses ZnS as a nonlinear medium 41 of etalon 33, the operation wavelength of signal beam Ps and control beam Pc is 514.5 nm, and the threshold intensity of incident light on nonlinear etalon 33 is 10 mW.

Figure 10:
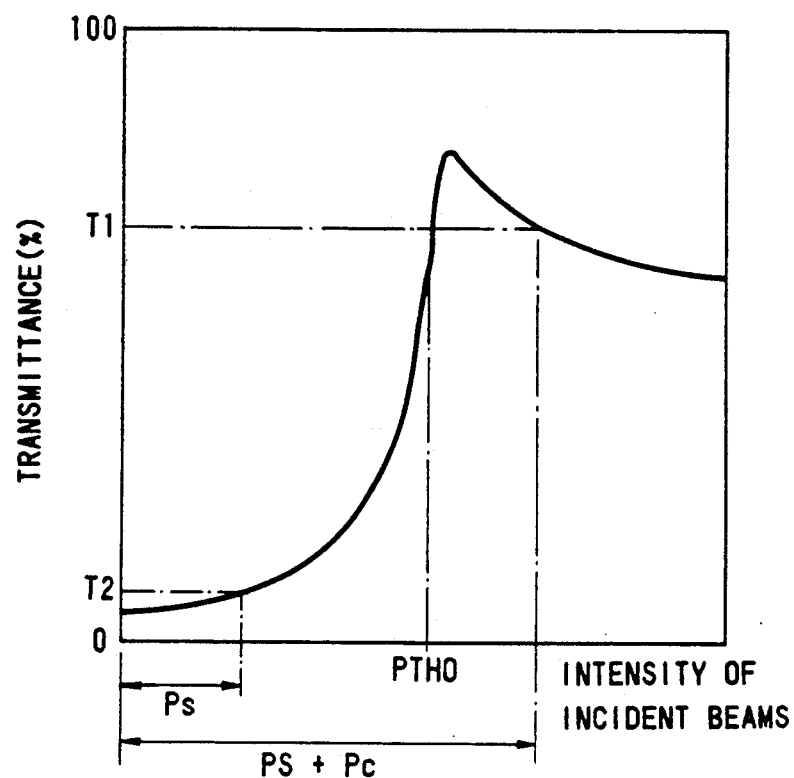
FIG. 10 is a graph showing the relationship between the intensity of the incident light and transmittance of nonlinear etalon 33 in the case where the operational detuning $\Delta\lambda$ is smaller than the critical detuning $\Delta\lambda b$.
Figure 11:
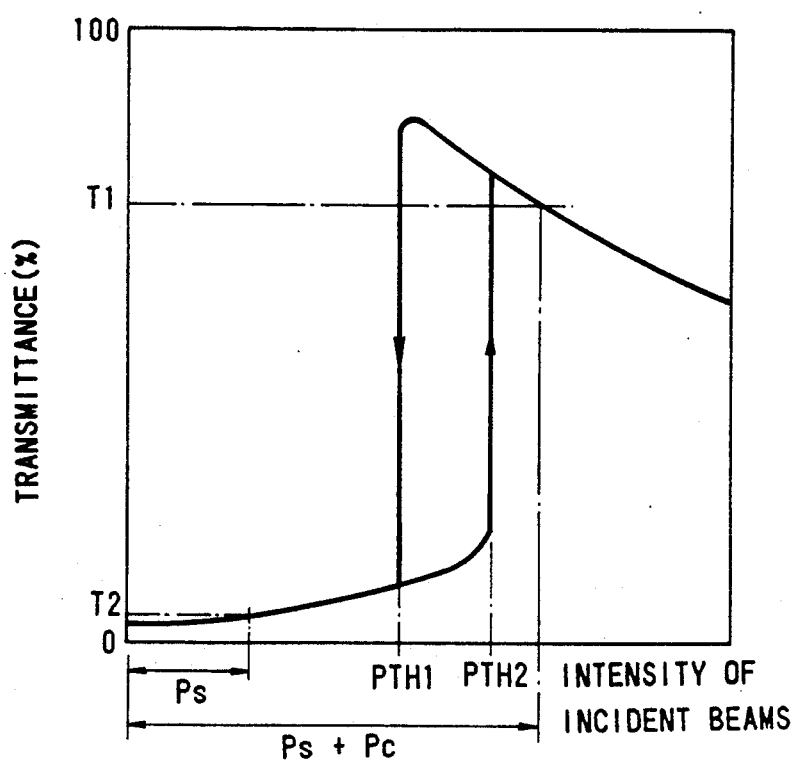
FIG. 11 is a graph showing the relationship between the intensity of the incident light and transmittance of nonlinear etalon 33 in the case where the operational detuning $\Delta\lambda$ is larger than the critical detuning $\Delta\lambda b$.

The switching operation described above is more specifically explained by the incident intensity of light versus transmittance characteristics of nonlinear etalon 33 shown in FIGS. 10 and 11. FIG. 10 shows the transmittance characteristics in the case where the operational detuning is smaller than the critical detuning, whereas FIG. 11 shows the transmittance characteristics in the case where the operational detuning is larger than the critical detuning. Referring to FIGS. 10 and 11, the level-setting of signal beam Ps and control beam Pc required for the above switching operation will be described.

FIGS. 10 and 11 show that nonlinear etalon 33 is of high transmittance T1 as long as signal beam Ps and control beam Pc are incident simultaneously, whereas it is of low transmittance T2 when only signal beam Ps is incident. Consequently, when nonlinear etalon 33 is used, having the characteristics shown in FIG. 10, the intensity levels of the beams Ps and Pc must be determined as follows: when one of the beams Ps and Pc is incident, the intensity of the incident beam Ps or Pc must not exceed threshold PTH0 of nonlinear etalon 33; when both beams Ps and Pc are incident, the total intensity thereof must exceed the threshold PTH0.

On the other hand, when nonlinear etalon 33 is used, having the characteristics shown in FIG. 11, the intensity levels of these beams Ps and Pc must be determined as follows: when one of the beams Ps and Pc is incident, the intensity of the incident beam Ps or Pc must not exceed switch-down threshold PTH1 of nonlinear etalon 33; when both beams Ps and Pc are incident, the total intensity thereof must exceed switch-up threshold PTH2.

The incident spots of signal beam Ps and control beam Pc on the left-end surface of focusing GRIN lens 25 are positioned so that they do not align with a line passing through the axis, as shown in FIG. 8. This makes it possible for the reflected beams Ps and Pc not to return to their optical sources. Signal beam Ps, passing through nonlinear etalon 33, advances in focusing GRIN lens 35, and is guided into optical fiber 39 through collimating GRIN lens 37, thus being emitted from optical fiber 39 as output beam Po.

Next, more specific features of embodiment 1 will be described with reference to FIGS. 12 to 14.

As shown in FIG. 6, signal beam Ps and control beam Pc are always focused on the center of the right-end surface of focusing GRIN lens 25 irrespective of their incident positions, as long as the beams are parallel to the axis when they are incident on the left-end surface of focusing GRIN lens 25. This is owing to the characteristic of a quarter pitch GRIN lens. Assuming that the distance from the axis to the incident position on the left-end surface of GRIN lens 25 is r, and the incident angle to nonlinear etalon 33 is $\theta$ (radians), the relationship between r and $\theta$ is represented by the following equation:

$$\theta = B \cdot r \tag{1}$$

where B is a constant.

A resonance wavelength of nonlinear etalon 33 varies according to the incident angle $\theta$. Assuming that the resonance wavelength of nonlinear etalon 33, when a beam is normally incident thereto, is $\lambda 0$, the resonance wavelength of nonlinear etalon 33, when a beam is incident thereto at an incident angle $\theta$, is $\lambda res(\theta)$, the refractive index on the axis of GRIN lens 25 is n0, and the effective refractive index of nonlinear medium 41 of etalon 33 is ne, the resonance wavelength $\lambda res(\theta)$ is given by the following equation:

$$\lambda res(\theta) = \lambda 0 * \{1\text{-}(n0/ne)^2 * \sin^2\theta\}^{\frac{1}{2}} \quad (2)$$

From equations (1) and (2), it is shown that the resonance wavelength λres(θ) of nonlinear etalon 33 can be controlled by the incident position r of control beam Pc and signal beam Ps on the left-end surface of GRIN lens 25. In other words, the operational detuning Δλ(=λ−λres:λ is a wavelength of the optical source of signal beam Ps) can be controlled by the incident position r.

In general, nonlinear etalon 33 has a critical detuning Δλb on the assumption that the nonlinear refractive index of nonlinear medium 41 is positive. FIG. 10 shows the transmission characteristics when 0<Δλ<Δλb, whereas FIG. 11 shows the transmission characteristics when Δλ>Δλb. The value of the critical detuning Δλb is about the same as a full width at half maximum (FWHM) of the spectrum of resonance wavelength of nonlinear etalon 33. As described above, the operational deturning Δλ can be modified by the incident position of signal beam Ps. As a result, the transmission characteristics in FIG. 10 or FIG. 11 can be easily selected by adjusting the positions of collimating GRIN lenses 23 and 29, i.e., by adjusting the incident positions of signal beam Ps and control beam Pc on the left-end surface of focusing GRIN lens 25.

Figure 12:
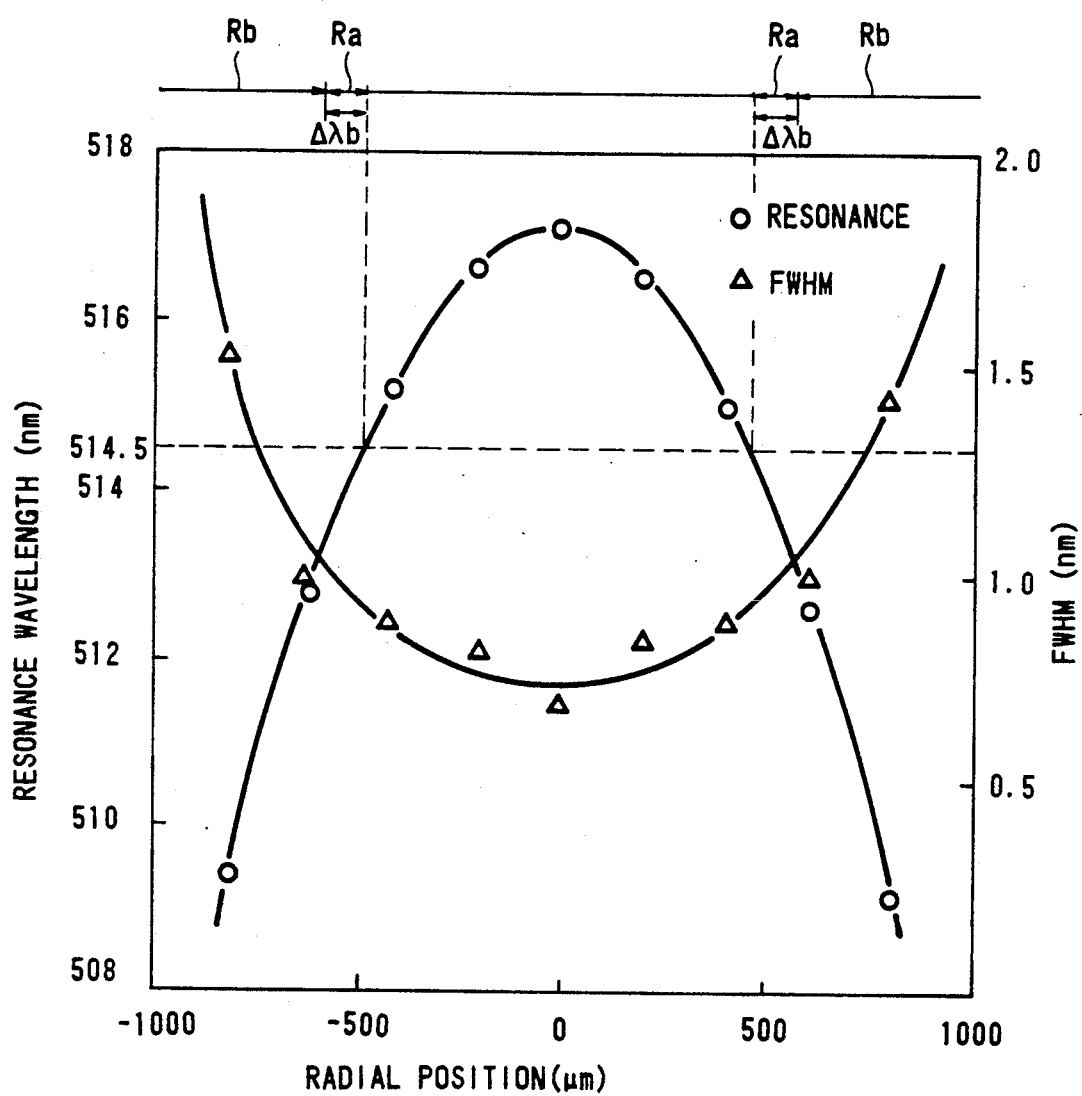
FIG. 12 is a graph showing the relationship between the positions of the incident beams on the left-end surface of converging lens 25 and resonance wavelengths and full widths at half maximum (FWHM)

FIG. 12 is a graph showing that the characteristics of nonlinear etalon 33 can be modified by changing the positions of the incident beams Ps and Pc on the left-end surface of focusing GRIN lens 25 and thus controlling the operational detuning.

In FIG. 12, the axis of the abscissa is a radial position of an incident beam, that is, the radial distance (μm) from the axis of focusing GRIN lens 25 to the incident position. On the other hand, the axis of the ordinate is a resonance wavelength (nm) of nonlinear etalon 33, or a full width at half maximum (FWHM) of resonant profile. In this case, the operational wavelength Δ is 514.5 nm, and the operational deturning Δλ is defined as λ−λres, where λres is a resonance wavelength. In range Ra in FIG. 12, in which the operational detuning Δλ is smaller than the critical detuning Δλb which is about the same as the full width at half maximum (FWHM), nonlinear etalon 33 exhibits transmission characteristics shown in FIG. 10; and in range Rb in which the operational deturning is larger than the critical detuning Δλb, etalon 33 shows a transmission characteristics in FIG. 11. The variable range of a resonance wavelength λres does not exceed about 5 nm, because the threshold of nonlinear etalon 33 increases with the increase of the full width at half maximum (FWHM) in a marginal area of focusing GRIN lens 33.

As described above, the operational detuning of nonlinear etalon 33 must be less than $10^{-1}$ of the full width at half maximum (FWHM). When a conventional method is used, in which the operational detuning is regulated only by the thickness of the nonlinear medium of the nonlinear etalon, the nonlinear medium of the nonlinear etalon must be fabricated so that the thickness of the nonlinear medium has an accuracy approximately $2 * 10^{-4}$, because the full width at half maximum (FWHM) is about 1 nm, and the operational wavelength of nonlinear etalon is approximately 0.5 μm. In contrast, in this embodiment 1, the operational detuning is regulated by adjusting the incident positions of the beams without changing the thickness of nonlinear etalon 33. In this case, it is sufficient that the wavelength of the incident beam is within the variable range of resonance wavelength, i.e., from λres(0) to λres(0)−5 nm. In other words, the thickness accuracy of nonlinear medium 41 is sufficient if it is within the range from λres(0) to λres−5 nm. Consequently, a thickness accuracy of about $10^{-2}$ is sufficient, which is less accurate by two orders of magnitude than the conventional required accuracy. Incidentally, the incident positions of the beams can be adjusted to the order of 1 μm. This accuracy corresponds to a value much less than the 0.1 nm associated with the thickness accuracy required of nonlinear etalon 33.

In this embodiment 1, the operational detunings of signal beam Ps and control beam Pc are not necessarily the same: the operational detunings can be separately determined by adjusting the incident positions of signal beam Ps and control beam Pc. For this additional freedom of setting, a higher on/off ratio of switching is obtained, even in one-wavelength operation in which wavelengths of signal beam Ps and control beam Pc are the same; the reason for this situation will be described below.

Figure 13:
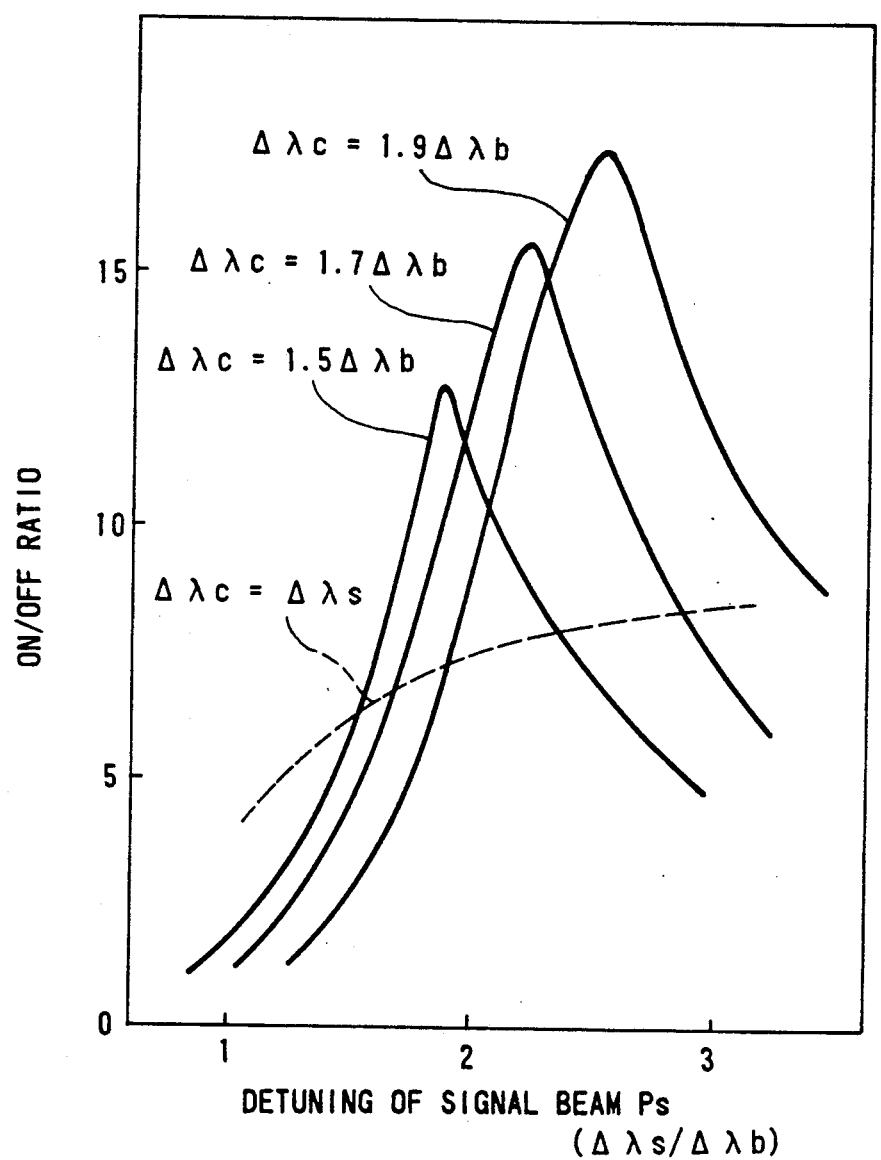
FIG. 13 is a graph showing the result of computation of on/off ratios of the all-optical switch for operational detuning.

FIG. 13 is a graph showing the result of computation of the relationship between the operational detuning of signal beam Ps and the on/off ratio. The axis of the abscissa is a ratio (Δλs/Δλb) of operational detuning Δλs of signal beam Ps and critical detuning Δλb. The axis of the ordinate is the on/off ratio. The solid curves indicate the on/off ratios when the operational detunings Δλc of control beam Pc are 1.5 Δλb, 1.7 Δλb, and 1.9 Δλb, respectively. In addition, the broken curve indicates the on/off ratio when the operational detunings of signal beam Ps and control beam Pc are the same. As shown in FIG. 13, a maximum on/off ratio of 17.5 is obtained when the operational detuning of signal beam Ps is about 2.5 Δλb, and that of control beam Pc is about 1.9 Δλb.

Figure 14:
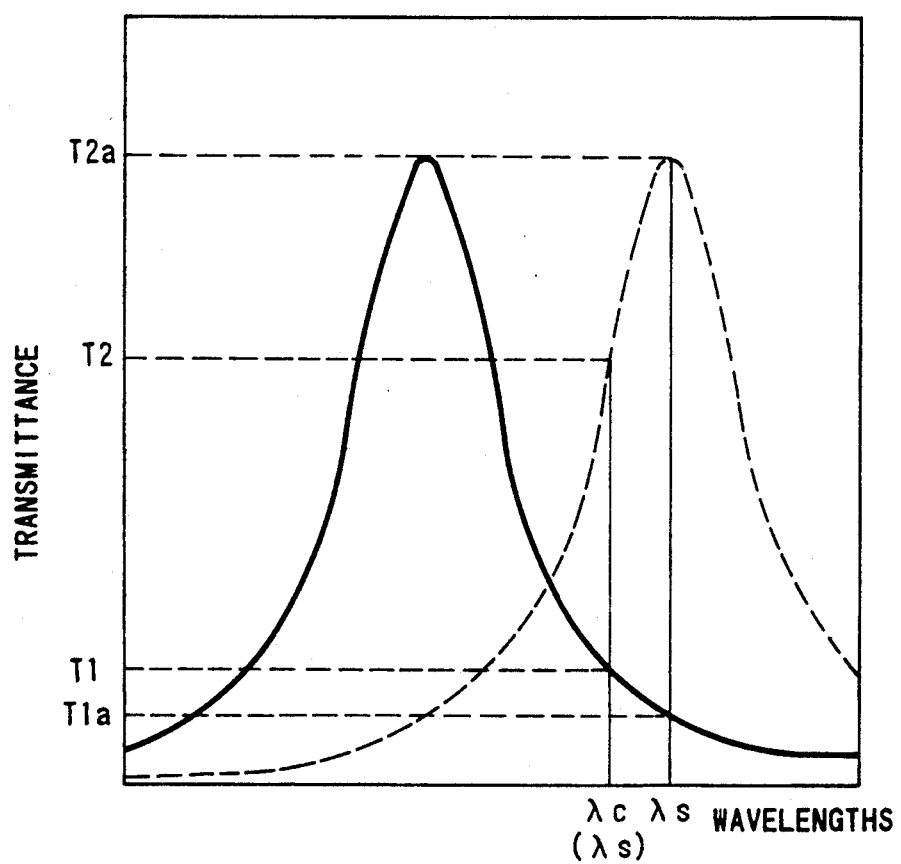
FIG. 14 is a graph to explain the reason for the increase in on/off ratios by using the off-axis system of embodiment 1.

FIG. 14 is a graph to illustrate the reason of the increase in on/off ratios. In FIG. 14, the solid curve shows a transmission profile of nonlinear etalon 33 when control beam Pc is not incident, while the broken curve indicates a transmission profile when control beam Pc is incident. The axis of the abscissa is a wavelength of control beam Pc or signal beam Ps. The axis of the ordinate is the transmittance of nonlinear etalon 33.

The on/off ratio when the wavelengths of signal beam Ps and that of control beam Pc are the same, is given as a ratio of transmittance T2 to T1 of nonlinear etalon 33, i.e., (T2/T1), where T1 is the transmittance when control beam Pc is not incident, while T2 is the transmittance when control beam Pc is incident. On the other hand, when the wavelengths of the beams Pc and Ps are different, the on/off ratio is given by the ratio (T2a/T1a), where T1a is the transmittance when control beam Pc is not incident, while T2a is the transmittance when control beam Pc is incident. Thus, the on/off ratio in two-wavelength operation increases.

As described above, the off-axis system of embodiment 1 make it possible to set the resonance wavelengths of signal beam Ps and control beam Pc independently by adjusting the incident positions thereof, so that the equivalent two-wavelength operation can be achieved, thus increasing the on/off ratio. In the above explanation, signal beam Ps is considered not to affect the transmittance of nonlinear etalon 33, because the intensity of signal beam Ps is small. Strictly speaking, however, the intensity and wavelengths of signal beam Ps as well as control beam Pc must be simultaneously considered.

The design of collimating GRIN lenses 23, 29, and 37, and focusing GRIN lenses 25 and 35 must be carried out considering the threshold of nonlinear etalon 33. Assuming the focused spot size on nonlinear etalon 33 is de, cone angle of incidence is ae, and the angle of incidence is $\theta$ (see equation (1) above), the threshold Pth of nonlinear etalon 33 is represented by the following function:

$$Pth = f(de, ae, \theta) \quad (3)$$

The focused spot size de, and the cone angle of incidence ae are represented by the following equations.

$$de = (Ac/Af)^{\frac{1}{2}} \cdot ds \quad (4)$$

$$ae = \{(\lambda/(\pi \cdot nO \cdot ds)\}/(Ac/Af)^{\frac{1}{2}} \quad (5)$$

where $\lambda$ is the wavelength of signal beam Ps and control beam Pc, ds is the core diameter of optical fibers 21 and 27, nO is the refractive index on the axis of focusing GRIN lens 25, Ac is the gradient constant of the refractive index of collimating GRIN lenses 23 and 29, and Af is the gradient constant of the refractive index of focusing GRIN lens 25.

Next, the maximum variable range of resonance wavelength $\lambda$res is determined. Since the resonance wavelength $\lambda$res corresponds to the angle of incidence $\theta$ (see equation (2) above), this corresponds to determining the maximum variable range of the angle of incidence $\theta$. The determined maximum angle of incidence is represented by $\theta$max.

When the focused spot size de on nonlinear etalon 33 is large compared with the diffusion distances of heat and carriers, threshold Pth of electronic nonlinear etalon, such as MQW (Multiple Quantum Well), is proportional to the square of the focused spot size de, whereas threshold Pth of thermal effect nonlinear etalon using ZnS is proportional to the focused spot size de. In other words, threshold Pth of electronic nonlinear etalon, such as MQW (Multiple Quantum Well), is proportional to the square of $(Ac/Af)^{\frac{1}{2}}$ (see equation (4)).

Threshold Pth is also altered by the cone angle of incidence ae: the value of the change depends on the finesse of nonlinear etalon 33, the maximum incident angle $\theta$max, and the thickness of nonlinear medium 41, and increases sharply when the cone angle of incidence ae becomes greater than a certain value. This means that the threshold Pth increases sharply when $(Ac/Af)^{\frac{1}{2}}$ declines below a certain value, because the cone angle of incidence ae is associated with $(Ac/Af)^{\frac{1}{2}}$ by the equation (5).

Figure 15:
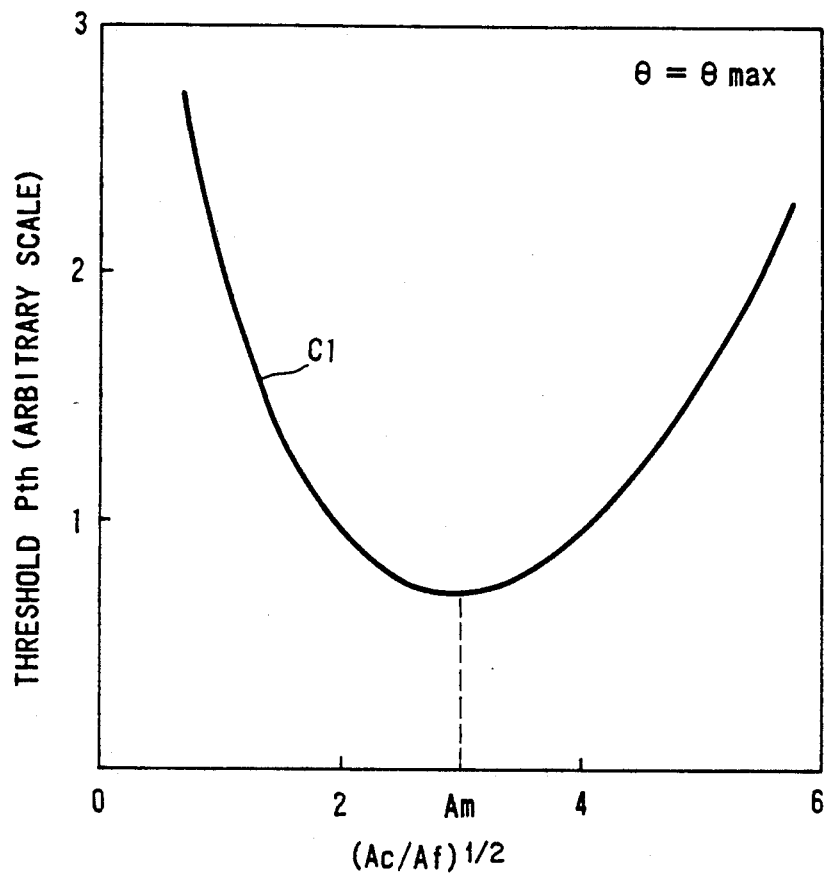
FIG. 15 is a graph showing the relationship between a threshold Pth of nonlinear etalon 33 and a ratio $(Ac/Af)^{\frac{1}{2}}$ of refractive-index-gradient constants of a collimating lens and a converging lens.

FIG. 15 is a graph showing the relationship between the threshold Pth of nonlinear etalon 33 and the ratio $(Ac/Af)^{\frac{1}{2}}$, when the incident angle $\theta$ is maximum $\theta$max. The curve C1 takes the minimum value of threshold Pth when $(Ac/Af)^{\frac{1}{2}}$ is Am, which is approximately equal to three. The threshold Pth approaches the square of $(Ac/Af)^{\frac{1}{2}}$ when the value of $(Ac/Af)^{\frac{1}{2}}$ is larger than Am, whereas the threshold Pth sharply increases as the value of $(Ac/Af)^{\frac{1}{2}}$ declines from Am to 0. Consequently, the value of $(Ac/Af)^{\frac{1}{2}}$ should be specified to be approximately equal to Am.

Although nonlinear medium 41 of nonlinear etalon 33 is composed of ZnS in embodiment 1, the nonlinear material is not limited to ZnS alone. For example, optical gate 40 made by the following processes can also be used.

First a 0.2 $\mu$m $Al_{0.33}Ga_{0.67}As$ is grown on a GaAs substrate, followed by 100 alternating layers each of 75 Å $Al_{0.33}Ga_{0.67}As$ and 75 Å GaAs. These alternating layers of 75 Å $Al_{0.33}Ga_{0.67}As$ and 75 Å GaAs are called an MQW (Multiple Quantum Well), which forms nonlinear medium 41. Subsequently, 8 alternating layers each of 97 Å $TiO_2$ and 150 Å $SiO_2$ are grown, which form front mirror 43 of 98% reflectance. Then, front mirror 43, formed on nonlinear medium 41 which was grown on the GaAs substrate, is bonded to focusing GRIN lens 25.

After that, the GaAs substrate is etched off so that the 0.2 $\mu$m $Al_{0.33}Ga_{0.67}As$ layer, which is a protective layer, is exposed. Subsequently, 8 alternating layers each of 97 Å $TiO_2$ and 150 Å $SiO_2$ are grown again, which form back mirror 45. Finally, the back mirror 45 is bonded to focusing GRIN lens 35 so that their axes are aligned, thus completing optical gate 40. Optical gate 40 thus made has an operational wavelength of 0.87 $\mu$m and a gating threshold of 5 mW.

Although mirrors 43 and 45 above have a dielectric multilayer structure of $TiO_2/SiO_2$, these mirrors are not limited to this type of structure. For example, these mirrors can be a dielectric multilayer mirror of ZnSe/NaF·3AlF$_3$, or can be composed of a metal such as Cr, Al, Au, or Ag, or semiconductors, or a complex thin film of these metals and semiconductors. In addition, a nonlinear medium can be made of the following materials besides the GaAs/AlGaAs described above: MQW composed of GaInAs/AlInAs or the like; chemical compound semiconductors from the periodic group III to V such as GaAs, InP, InSb, and InAs; chemical compound semiconductors from the periodic group II to VI such as ZnSe, ZnS, CdS, and CdTe; semiconductors such as Te, CdHgTe, and CuCl; semiconductor doped glass made by dispersing about 100 Å micro-particles of semiconductors such as $CdS_{1-x}S_x$ into a glass; or organic compounds having a large nonlinearity constant, such as poly(diacethylene), 2-Methyl-4-nitroaniline.

The reflectances of mirrors 43 and 45 can be altered by changing the number of layers when these mirrors are made of dielectric material, or by changing the thickness of the films when these mirrors are made of metal. Using these techniques, the reflectance of nonlinear etalon 33 at the resonance wavelength can be made 0 under the following condition:

$$MRf = MRb \cdot \exp(-2 \cdot Ab \cdot WNL)$$

where:
MRf is the reflectance of mirror 43;
MRb is the reflectance of mirror 45;
Ab is the absorption coefficient of nonlinear medium 41; and
WNL is the thickness of nonlinear medium 41.

As described above, in this embodiment 1, the setting of operational detuning of nonlinear etalon 33 is accomplished by adjusting the position of collimating GRIN lenses 23 and 29, which makes the setting much easier, and reduces the required accuracy of thickness of nonlinear medium 41 by one or more orders of magnitude than the accuracy required in conventional methods. In addition, the operational detuning of signal beam Ps and control beam Pc can be determined independently, so that the separation of signal beam Ps and control beam Pc is carried out completely. As a result, high on/off ratio switching can be performed even in one-wavelength operation. Furthermore, the components such as collimating GRIN lenses 23, 29 and 37, focusing GRIN lenses 25 and 35, nonlinear etalon 33, mirrors 43 and 45, and optical fibers 21, 27 and 39, are assembled into one unit, being composed as a module. This facilitates the handling of the switch and makes it possible to assemble the switch into other devices.

Moreover, since signal beam Ps is directly controlled by control beam Pc without being converted into an electrical signal, wideband switching utilizing the feature of light is achieved without restriction by the bandwidth of an electrical circuit.

Furthermore, since optical gate 40 has two focusing GRIN lenses 25 and 35 bonded on each side of nonlinear etalon 33, high power density of the beams can be obtained so as to drive nonlinear etalon 33 into operation owing to the converging power of these lenses. In addition, focusing GRIN lenses 25 and 35 are suitable to be bonded to nonlinear etalon 33, because these lenses are gradient-index type of lenses and so have flat end surfaces that match the shape of etalon 33, which also has flat surfaces. Thus, optical gate 40 is easy to fabricate, and the alignment of axes of these lenses can be achieved easily.

[2] EMBODIMENT 2 (PRIMARY TYPE 2)

Figure 16:
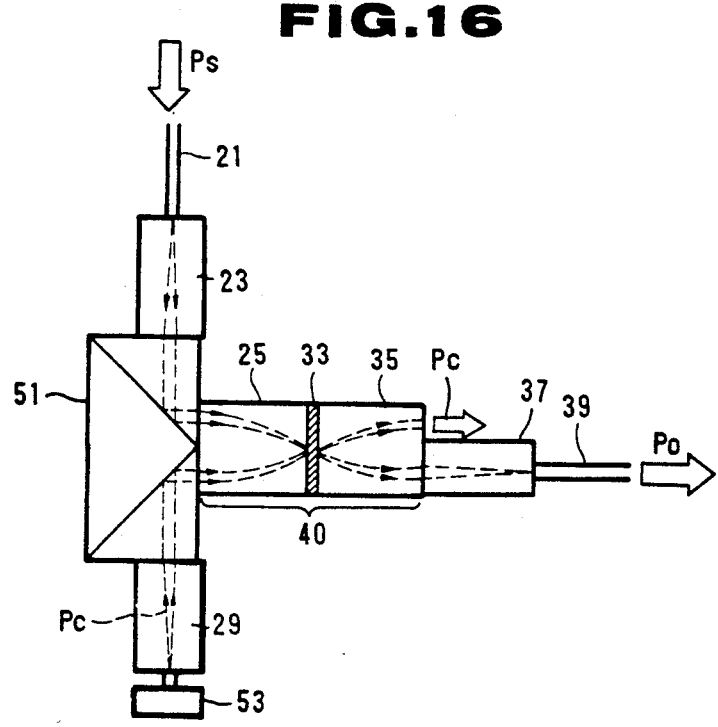
FIG. 16 is a side view showing a configuration of a primary-type all-optical switch according to embodiment 2 of the present invention.

FIG. 16 is a side view showing a configuration of a primary-type all-optical switch according to embodiment 2 of the present invention. Embodiment 2 differs from embodiment 1 in the following two features: first, embodiment 2 has mirror prism 51 inserted between focusing GRIN lens 25 and collimating GRIN lenses 23 and 29; second, embodiment 2 has laser diode 53 that launches control beam Pc into collimating GRIN lens 29, instead of optical fiber 27 of embodiment 1 (see FIG. 6). As a result, position adjustment and setting of collimating GRIN lenses 23 and 29 is facilitated in comparison to embodiment 1. Other arrangements, operations and effects of embodiment 2 are similar to those of embodiment 1.

[3] EMBODIMENT 3 (2-WAVELENGTH TYPE 1)

Figure 17:
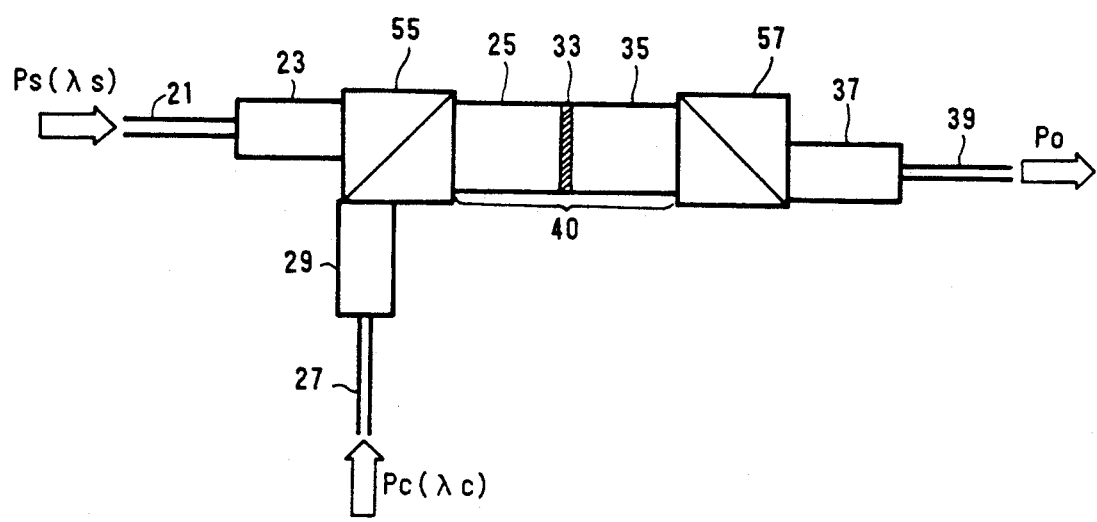
FIG. 17 is a side view showing a configuration of a two-wavelength-type all-optical switch according to embodiment 3 of the present invention.

FIG. 17 is a side view showing a configuration of a two-wavelength-type all-optical switch according to embodiment 3 of the present invention. Embodiment 3 is different from embodiment 1 in the following features:

(1) Embodiment 3 uses dichroic mirror 55 instead of mirror 31 in embodiment 1 (see FIG. 6), so that signal beam Ps and control beam Pc are incident to optical gate 40;

(2) Embodiment 3 places another dichroic mirror 57 between focusing GRIN lens 35 and collimating GRIN lens 37 to separate signal beam Ps from control beam Pc;

(3) Embodiment 3 uses two different wavelengths for signal beam Ps and control beam Pc.

Dichroic mirrors 55 and 57 transmit signal beam Ps (wavelength $\lambda s$), but reflect control beam Pc (wavelength $\lambda c$) in the direction perpendicular to the incident direction.

Figure 18:
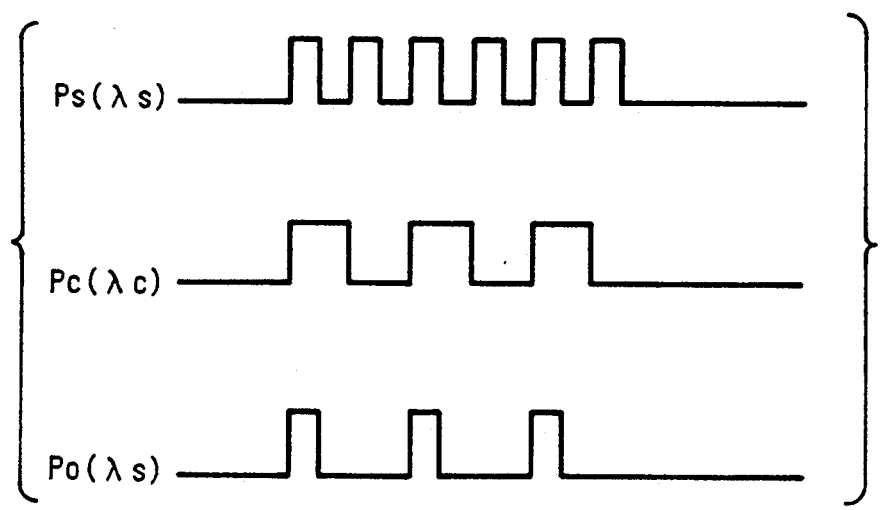
FIG. 18 is a timechart showing the operation of the all-optical switch of embodiment 3.

Operation of embodiment 3 will no be explained with reference to FIG. 18.

Signal beam Ps($\lambda s$) of wavelength $\lambda s$, passing through optical fiber 21 and collimated by collimating GRIN lens 23, and control beam Pc($\lambda c$) of wavelength $\lambda c$, passing through optical fiber 27 and collimated by collimating GRIN lens 29, are incident on dichroic mirror 55. Signal beam Ps passes through dichroic mirror 55 and is incident on the left-end surface of focusing GRIN lens 25, while control beam Pc is reflected by dichroic mirror 55 and is also incident on the left-end surface of focusing GRIN lens 25. These beams are converged by focusing GRIN lens 25, thus being focused onto the surface of etalon 33.

When control beam Pc is incident on etalon 33, signal beam Ps and control beam Pc are transmitted through nonlinear etalon 33 without attenuation, and are incident on dichroic mirror 57. Dichroic mirror 57 transmits only signal beam Ps($\lambda s$), and reflects control beam Pc($\lambda c$). As a result, only signal beam Ps is incident to collimating GRIN lens 37, and is emitted from optical fiber 39 a output beam Po.

In contrast, when control beam Pc is not incident, signal beam Ps cannot pass through nonlinear etalon 33, and so there is no output beam Po.

Since this embodiment 3 uses two different wavelength $\lambda s$, and $\lambda c$ ($\lambda s > \lambda c$), these wavelengths are free to be set: the wavelength of signal beam Ps is selected so that a large on/off ratio can be achieved, whereas the wavelength of control beam Pc is determined so that a small threshold of etalon 33 is obtained. As a result, a higher on/off ratio of signal beam Ps and a smaller operating power of control beam Pc are simultaneously achieved. In addition, signal beam Ps is switched so as to completely separate from control beam Pc. This makes it possible to switch a signal beam Ps of a much lower intensity than in the conventional apparatus, and reduces the cross talk between signal beam Ps and control beam Pc.

[4] EMBODIMENT 4 (2-WAVELENGTH TYPE 2)

Figure 19:
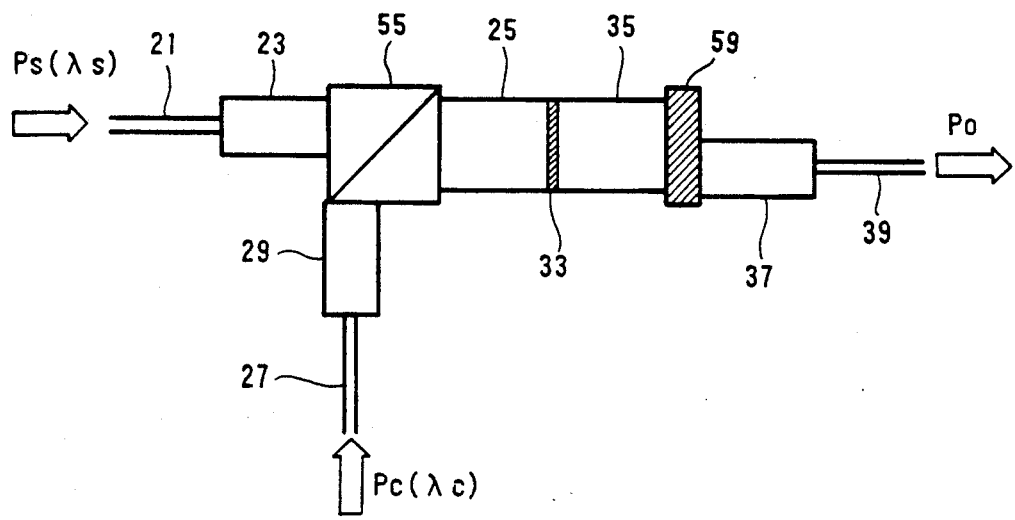
FIG. 19 is a side view showing a configuration of a two-wavelength-type all-optical switch according to embodiment 4 of the present invention.

FIG. 19 is a side view showing a configuration of a two-wavelength-type all-optical switch according to embodiment 4 of the present invention. Embodiment 4 is different from embodiment 3 in that embodiment 4 uses wavefilter 59 instead of dichroic mirror 57. Wavefilter 59 transmits only signal beam Ps of wavelength $\lambda s$, and thereby separates transmitted signal beam Ps($\lambda s$) from control beam Pc, thus producing it from optical fiber 39 as output beam Po. Wavefilter 59 is selected from interference filters using dielectric multilayers or metal thin films, or other optical filters such as those using dyes. Other arrangements, operations, and effects of embodiment 4 are the same as those of embodiment 3.

EMBODIMENT 5 (2-BEAM-POLARIZED TYPE 1)

Figure 20:
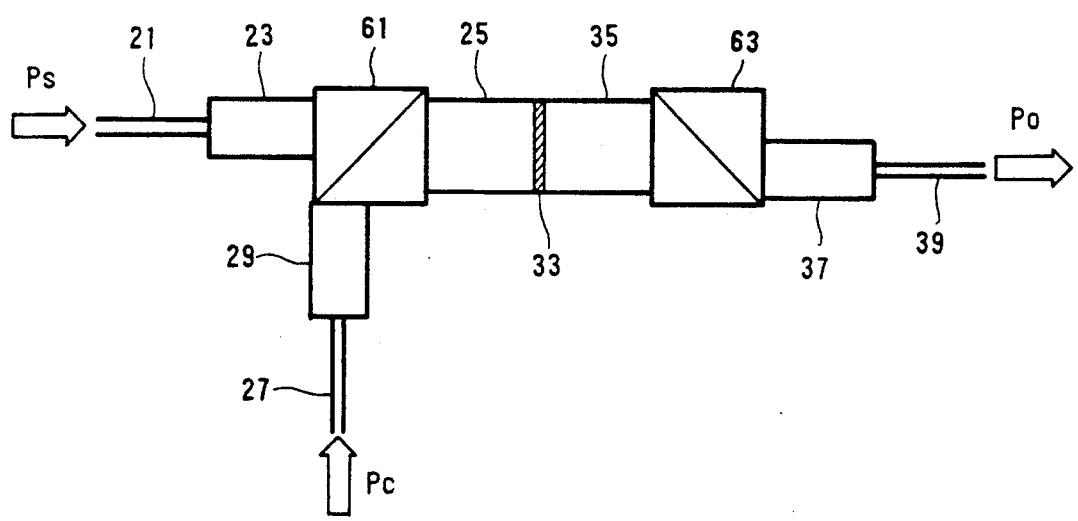
FIG. 20 is a side view showing a configuration of a two-beam-polarized-type all-optical switch according to embodiment 5 of the present invention.

FIG. 20 is a side view showing a configuration of a two-beam-polarized-type all-optical switch according to embodiment 5 of the present invention. Embodiment 5 differs from embodiment 3 in that embodiment 5 uses two polarization beam splitters 61 and 63 instead of dichroic mirrors 55 and 57 in embodiment 3 (see FIG. 17). These beam splitters 61 and 63 transmit horizontally polarized waves, but reflect vertically polarized waves in the direction perpendicular to the incident direction thereof.

Figure 21:
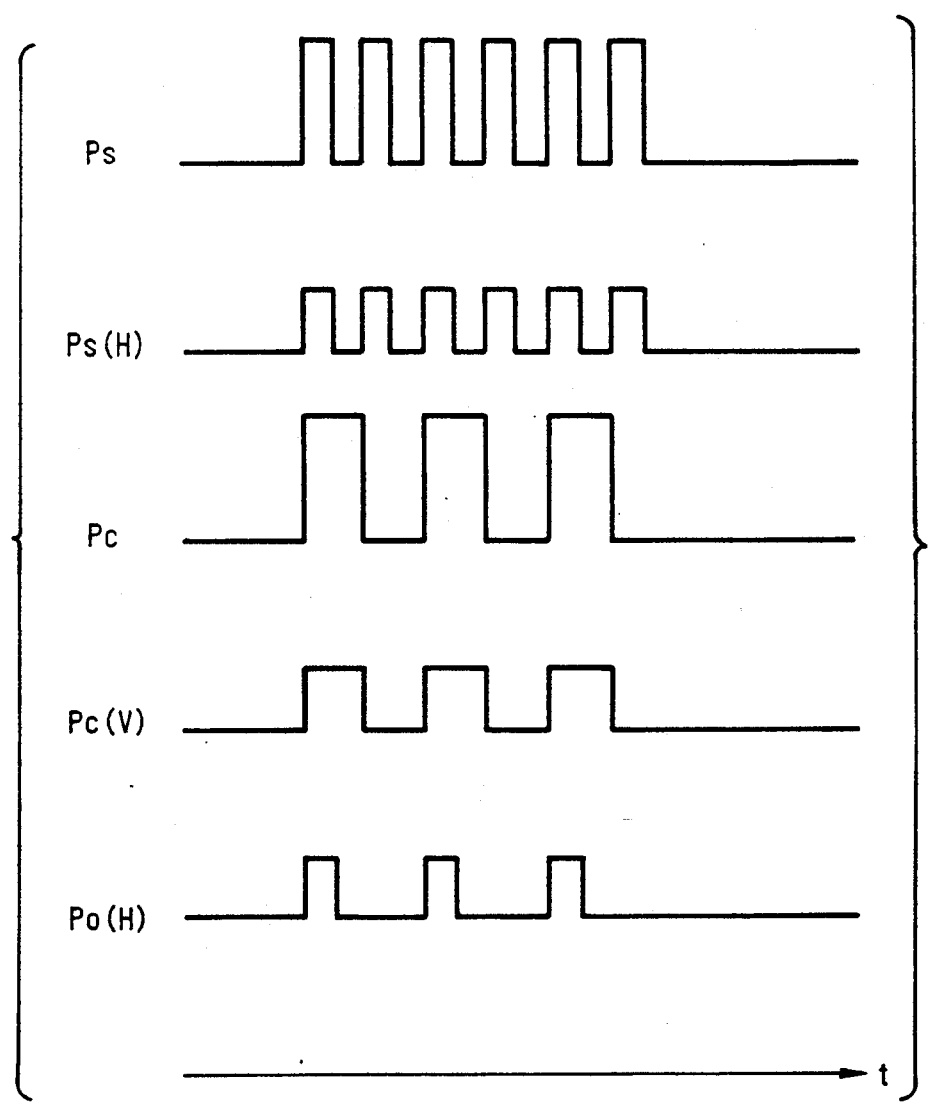
FIG. 21 is a timechart showing the operation of the all-optical switch of embodiment 5.

Operation of embodiment 3 will be explained with reference to FIG. 21.

Signal beam Ps passing through optical fiber 21 and collimated by collimating GRIN lens 23, and control beam Pc passing through optical fiber 27 and collimated by collimating GRIN lens 29, are incident on polarization beam splitter 61. Polarization beam splitter 61 then transmits the horizontally polarized wave Ps(H) of signal beam Ps so as to be incident on the left-end surface of focusing GRIN lens 25, while reflecting the vertically polarized wave Pc(V) of control beam Pc so as to be incident on the left-end surface of focusing GRIN lens 25. These beams are converged by focusing GRIN lens 25, thus being focused onto the surface of etalon 33.

When control beam Pc(V) is incident on etalon 33, two orthogonal beams, i.e., signal beam Ps(H) and control beam Pc(V) are transmitted through nonlinear etalon 33 without attenuation, and are incident on polarization beam splitter 63. Polarization beam splitter 63 transmits only signal beam Ps(H), and reflects control beam Pc(V). As a result, only signal beam Ps(H) is incident on collimating GRIN lens 37, and is emitted from optical fiber 39 as output beam Po(H).

In contrast, when control beam Pc(V) is not incident, signal beam Ps(H) cannot pass through nonlinear etalon 33, and consequently there is no output beam Po.

Embodiment 5 can reduce the cross talk between signal beam Ps and control beam Pc, because embodiment 5 uses orthogonal linearly polarized waves as signal beam Ps and control beam Pc to be incident on optical gate 40. In addition, a higher on/off ratio of switching can be obtained because polarization beam splitter 63 cuts off the unnecessary output component, i.e., control beam Pc(V). Furthermore, signal beam Ps is switched so as to completely separate from control beam Pc. This makes it possible to switch a signal beam Ps of very low intensity.

Embodiment 5 described above launches unpolarized beams into optical fibers 21 and 27, and then polarizes these beams by means of polarization beam splitter 61. However, horizontally polarized signal beam Ps(H) and vertically polarized control beam Pc(V) can also be directly launched into optical fibers 21 and 27.

EMBODIMENT 6 (2-BEAM-POLARIZED TYPE 2)

Figure 22:
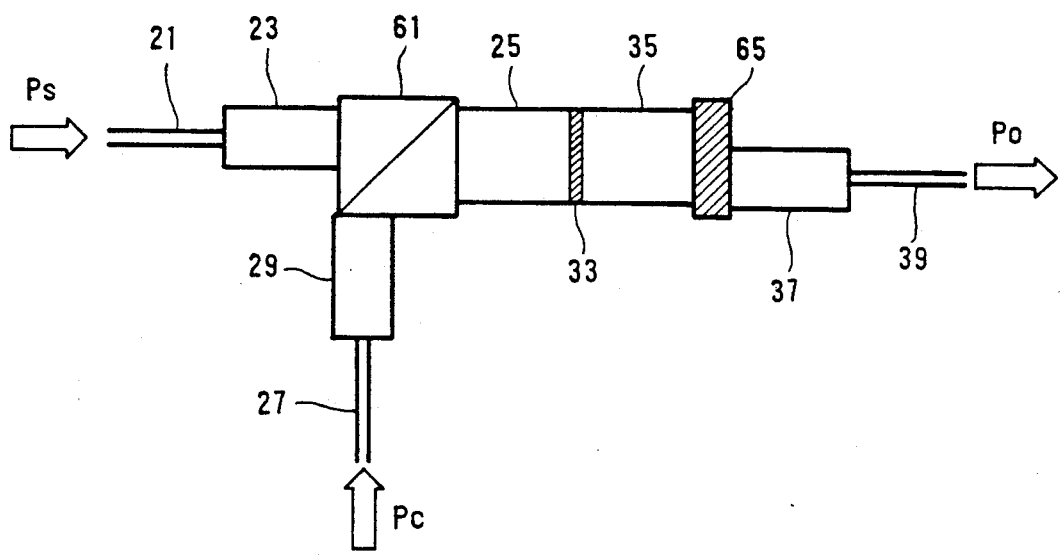
FIG. 22 is a side view showing a configuration of a two-beam-polarized-type all-optical switch according to embodiment 6 of the present invention.

FIG. 22 is a side view showing a configuration of a two-beam-polarized-type all-optical switch according to embodiment 6 of the present invention. Embodiment 6 differs from embodiment 5 in that embodiment 6 places analyzer 65 instead of polarization beam splitter 63 at the output side. This analyzer 65 transmits only horizontally polarized waves, that is, only signal beam Ps(H). Other arrangements, operations and effects of embodiment 6 are the same as those of embodiment 5.

EMBODIMENT 7 (REFLECTING TYPE 1)

Figure 23:
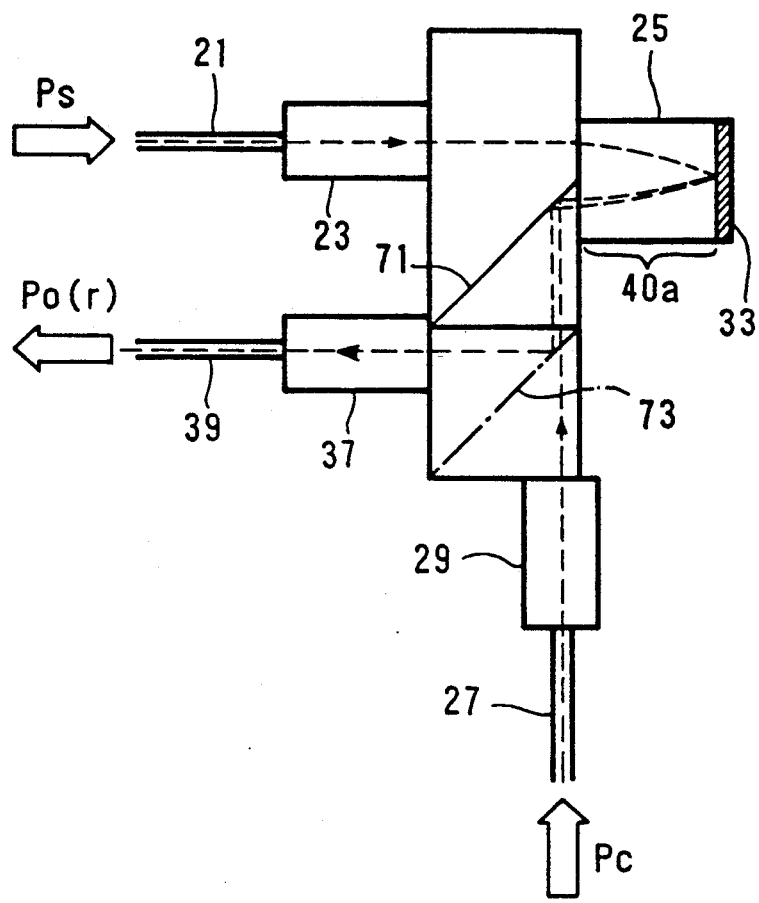
FIG. 23 is a side view showing a configuration of a reflecting-type all-optical switch according to embodiment 7 of the present invention.

FIG. 23 is a side view showing a configuration of a reflecting-type all-optical switch according to embodiment 7 of the present invention. This embodiment 7 is arranged so that a reflected signal beam is outputted instead of the transmitted signal beam.

Optical gate 40a is constructed by bonding focusing GRIN lens 25 to the left surface of nonlinear etalon 33, and a mirror section is made by bonding mirror 71 and partial mirror 73. Then the left-end surface of focusing GRIN lens 25 is bonded to the portion of mirror 71 of the mirror section. Partial mirror 73 is made so that it reflects the light incident on this side of FIG. 23, and transmits the light incident on the remaining part of the partial mirror 73.

To the left-end surface of focusing GRIN lens 25, signal beam Ps and control beam Pc are incident. More specifically, signal beam Ps, passing through optical fiber 21 and collimated by collimating GRIN lens 23, is transmitted through the mirror section and is incident on the left-end surface of focusing GRIN lens 25. On the other hand, control beam Pc, passing through optical fiber 27 and collimated by collimating GRIN lens 29, is transmitted through partial mirror 73, reflected by mirror 71, and is incident on the left-end surface of focusing GRIN lens 25. These beams Ps and Pc are converged by focusing GRIN lens 25, and are focused onto the center of the surface of etalon 33, where signal beam Ps is reflected when control beam Pc is absent. Reflected signal beam Ps at nonlinear etalon 33 is reflected again by mirror 71 and partial mirror 73. After that, signal beam Ps is incident to collimating GRIN lens 37, and is emitted from optical fiber 39 as reflected output beam Po(r). In this case, collimating GRIN lenses 23, 29 and 37 are respectively changeable in two directions perpendicular to the axes of these lenses. In other words, the incident positions of signal beam Ps and control beam Pc to the left-end surface of focusing GRIN lens 25 can be adjusted by displacing the positions of collimating GRIN lenses 23, 29 and 37.

Figure 25:
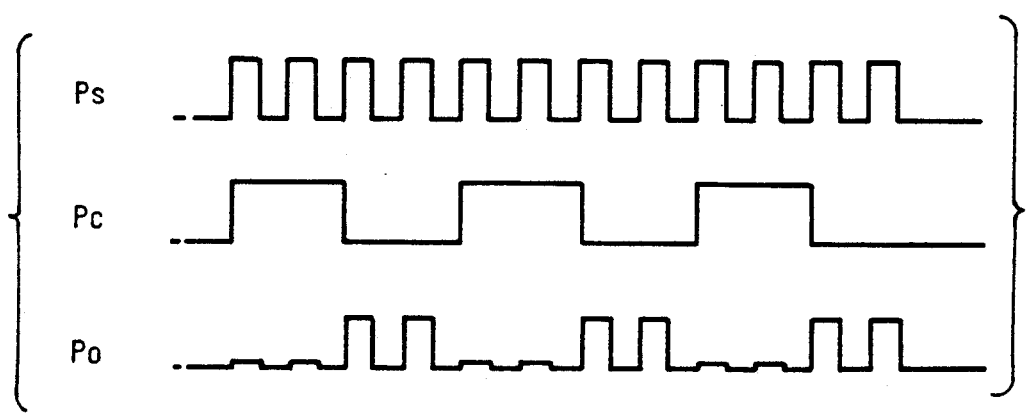
FIG. 25 is a timechart showing the operation of the all-optical switch of embodiment 7.
Figure 24:
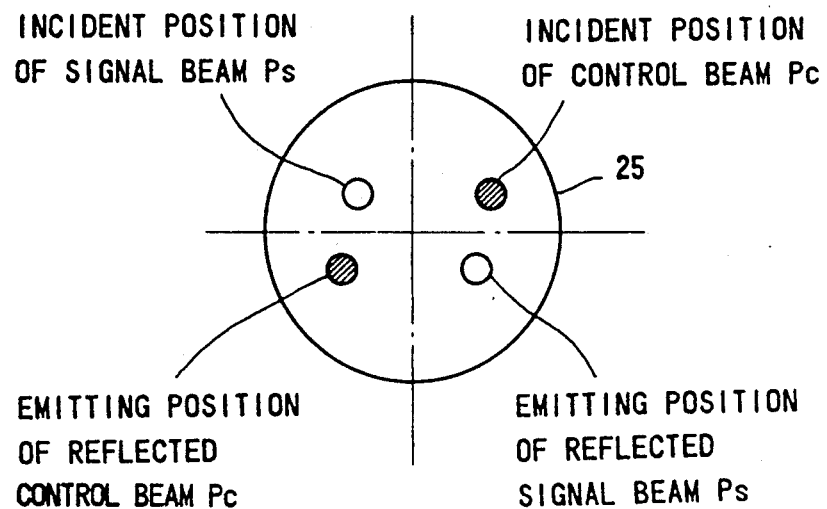
FIG. 24 is a sectional view showing the position of beam spots on the left-end surface of converging lens 25 of embodiment 7.

FIG. 24 is a sectional view showing the incident and emitted positions of signal beam Ps and control beam Pc on the left-end surface of focusing GRIN lens 25. This FIG. 24 shows the left-end surface of focusing GRIN lens 25 seen from the left side of the apparatus in FIG. 23, and the top edge of the figure seen in FIG. 24, is also seen as the left-end surface of focusing GRIN lens 25 in FIG. 23. As shown in FIG. 24, signal beam Ps and control beam Pc are positioned so that these beams are not aligned with a line passing through the axis of focusing GRIN lens 25, and therefore the reflected signal beam Ps and the reflected control beam Pc can be controlled so as not to return to the sources from which the beams originated. Thus, signal beam Ps is switched so as to completely separate from control beam Pc. This makes it possible to switch a signal beam Ps of a much lower intensity than in the conventional apparatus, and also to reduce the cross talk between signal beam Ps and control beam Pc. FIG. 25 is a timechart showing the operation of the all-optical switch of embodiment 7. When control beam Pc is incident, nonlinear etalon 33 does not substantially reflect signal beam Ps, and so output beam Po(r) produced by the reflection of nonlinear etalon 33 is substantially zero. On the other hand, when control beam Pc is not incident, nonlinear etalon 33 reflects signal beam Ps, and so reflected output beam Po(r) is emitted from optical fiber 39. From these facts, it is seen that the reflecting-type of all-optical switch of embodiment 7 operates as a complimentary switch of the transmitting type of all-optical switch of embodiment 1: when control beam Pc is incident, the switch in embodiment 1 produces output beam Po, whereas the switch in embodiment 7 does not produce output beam Po; when control beam Pc is not incident, the switch of embodiment 1 does not produce output beam Po, while the switch of embodiment 7 does produce output beam Po.

Figure 26:
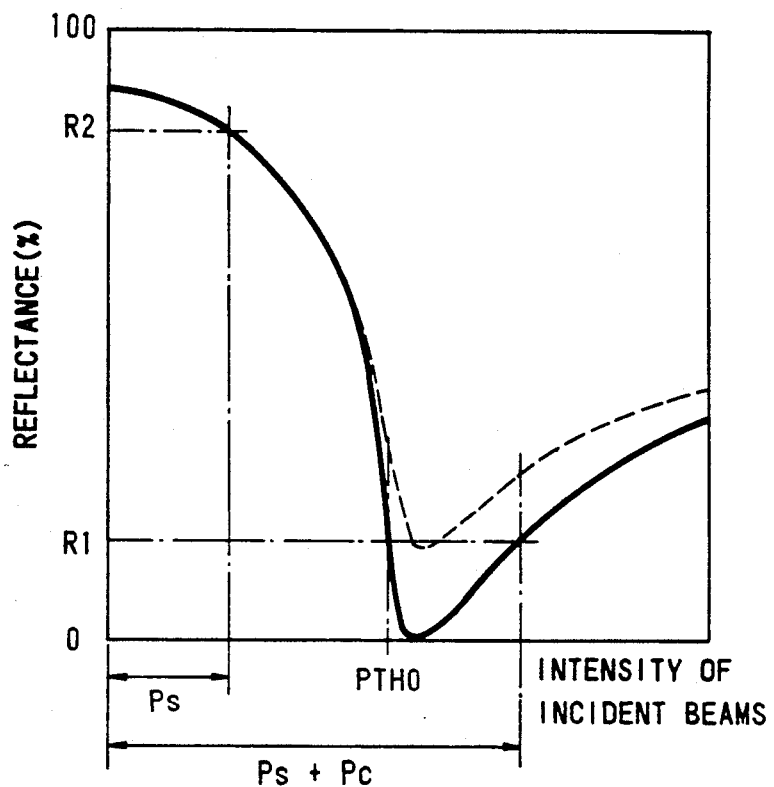
FIG. 26 is a graph showing the relationship between the intensity of the incident light and the reflectance of nonlinear etalon 33 in the case where the operational detuning $\Delta\lambda$ is smaller than the critical detuning $\Delta\lambda$ b.
Figure 27:
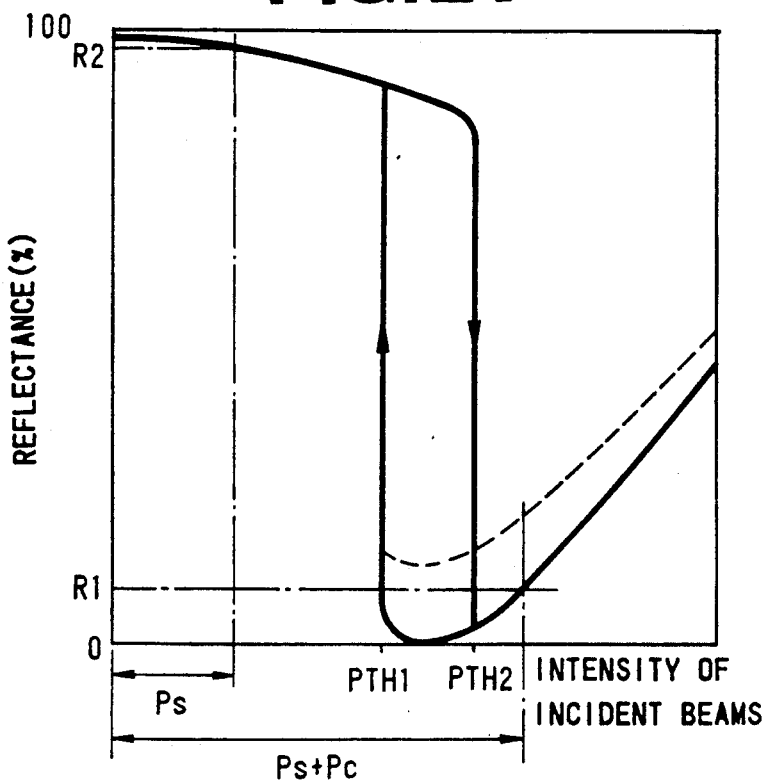
FIG. 27 is a graph showing the relationship between the intensity of the incident light and the reflectance of nonlinear etalon 33 in the case where the operational detuning $\Delta\lambda$ is larger than the critical detuning $\Delta\lambda$ b.

FIGS. 26 and 27 are graphs showing the relationships between the intensity of the incident light and the reflectance of nonlinear etalon 33: FIG. 26 shows the reflective characteristics of nonlinear etalon 33 when the operational detuning $\Delta\lambda$ is less than the critical detuning $\Delta\lambda b$; whereas FIG. 27 shows the reflective characteristics when operational detuning $\Delta\lambda$ is larger than the critical detuning $\Delta\lambda b$.

When nonlinear etalon 33 is used, having the characteristics shown in FIG. 26, the intensity level of signal beam Ps must be specified so that the intensity level does not exceed the threshold PTH0 of the reflecting mode of nonlinear etalon 33, and at the same time, the intensity level of the sum of beams Ps and Pc must be determined to exceed the threshold PTH0.

In contrast, when nonlinear etalon 33 is used, having the characteristics shown in FIG. 27, the intensity level of signal beam Ps must be specified so that the intensity level does not exceed the switch-up threshold PTH1 of nonlinear etalon 33, and at the same time, the intensity level of the sum of beams Ps and Pc must be determined to exceed the switch-down threshold PTH2. These settings make it possible for nonlinear etalon 33 to be in a low reflectance R1 state when both signal beam Ps and control beam Pc are incident, and to be in a high reflectance R2 state when only signal beam Ps is incident.

In FIGS. 26 and 27, the dotted lines show the reflective characteristics when the nonlinear etalon 33 is symmetric, i.e., when the reflectance MRf of front mirror 43 is equal to the reflectance MRb of back mirror 45. In contrast, the solid lines show the reflective characteristics when the nonlinear etalon is asymmetric, i.e., when these reflectances are different. In the asymmetric case, although the on/off ratios of transmitted light decrease slightly, the on/off ratios of reflected light increase more than the amount of decrease in the transmitted on/off ratios.

Thus, the reflecting-type of optical switch in embodiment 7 turns signal beam Ps on and off by using control beam Pc, achieving an effect similar to that of embodiment 1.

EMBODIMENT 8 (REFLECTING TYPE 2)

Figure 28:
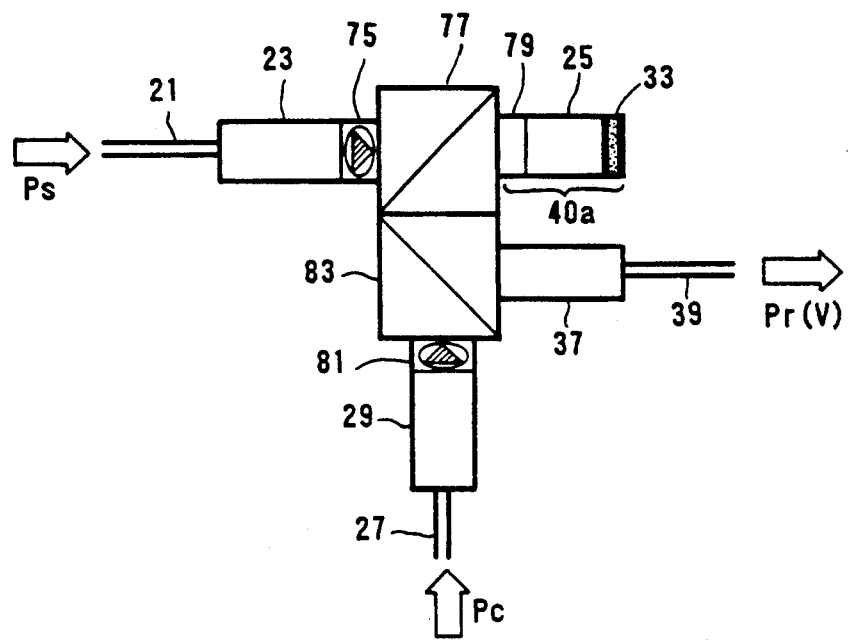
FIG. 28 is a side view showing a configuration of a reflecting-type all-optical switch according to embodiment 8 of the present invention.

FIG. 28 is a side view showing a configuration of a reflecting-type all-optical switch according to embodiment 8 of the present invention. This embodiment 8 is similar to embodiment 7 in that the switch of embodiment 8 operates as a complementary switch of the transmitting-type all-optical switches described above.

In FIG. 28, signal beam Ps, passing through optical fiber 21 and collimated by collimating GRIN lens 23, is transmitted sequentially through optical isolator 75, polarization beam splitter 77, and a quarter-wave plate 79, and is incident on the left-end surface of focusing GRIN lens 25. On the other hand, control beam Pc, transmitted through optical fiber 27 and collimated by collimating GRIN lens 29, is passing sequentially through optical isolator 81, half-mirror 83, polarization beam splitter 77, and quarter-wave plate 79, and is ultimately incident on the left-end surface of focusing GRIN lens 25. These beams Ps and Pc are converged by focusing GRIN lens 25, and are focused onto the axis of etalon 33. To half-mirror 83, is attached a fiber collimator composed of collimating GRIN lens 37 and optical fiber 39, so that the fiber collimator is perpendicular to the axis of collimating GRIN lens 29.

The operation of embodiment 8 is as follows:

Signal beam Ps, passing through optical fiber 21, collimated by collimating GRIN lens 23, and transmitted through optical isolator 75; and control beam Pc, passing through optical fiber 27, collimated by collimating GRIN lens 29, and transmitted through optical isolator 81 and half-mirror 83, are both incident on polarization beam splitter 77. Polarization beam splitter 77 transmits the horizontally polarized wave Ps(H) of signal beam Ps, while reflecting the vertically polarized wave Pc(V) of control beam Pc in the direction perpendicular to the incident direction of control beam Pc. These beams Ps and Pc are incident on quarter-wave plate 79, and are converted from linearly polarized light into circularly polarized light. The converted beams Ps and Pc are incident on optical gate 40a, and are converged by focusing GRIN lens 25, thus being focused onto the axis of nonlinear etalon 33.

When control beam Pc is not incident on etalon 33, signal beam Ps focused on nonlinear etalon 33 is reflected by nonlinear etalon 33 with little attenuation, and is incident on quarterwave plate 79. Signal beam Ps, linearly polarized again by passing through quarter-wave plate 79, is incident on polarization beam splitter 77 in the form of linearly polarized reflected beam Pr(V). This beam Pr(V) is sequentially reflected by Polarization beam splitter 77 and half-mirror 83, incident on collimating GRIN lens 37, and emitted from optical fiber 39 as reflected output beam Pr(V).

In contrast, when control beam Pc is incident, signal beam Ps is not substantially reflected by nonlinear etalon 33, and so there is no output beam Pr(V).

Thus, the reflecting-type all-optical switch of embodiment 8 can achieve similar operations and effects as those of embodiment 7. In addition, a higher on/off ratio of switching can be obtained because polarization beam splitter 77 cuts off the unnecessary output component, i.e., control beam Pc. Furthermore, signal beam Ps is switched so as to completely separate from control beam Pc because signal beam Ps and control beam Pc have different planes of polarization. This makes it possible to switch a signal beam Ps of a much lower intensity than in a conventional apparatus.

EMBODIMENT 9 (REFLECTING TYPE 3)

Figure 29:
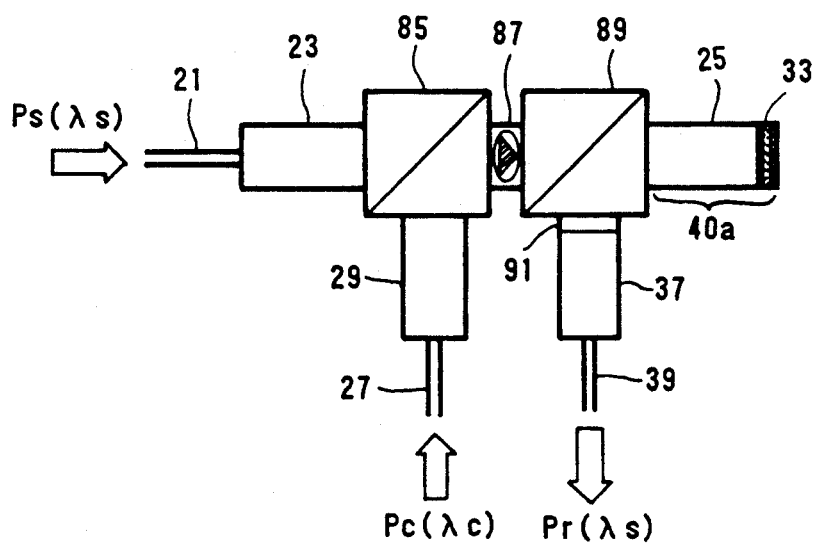
FIG. 29 is a side view showing a configuration of a reflecting-type all-optical switch according to embodiment 9 of the present invention.

FIG. 29 is a side view showing a configuration of a reflecting-type all-optical switch according to embodiment 9 of the present invention. In this embodiment 9, signal beam Ps and control beam Pc are incident on optical isolator 87 through dichroic mirror 85 that transmits signal beam Ps (wavelength $\lambda s$) and reflects control beam Pc (wavelength $\lambda c$). These beams Ps and Pc are further transmitted through optical isolator 87 and half-mirror 89, and are incident on the left-end surface of focusing GRIN lens 25. Signal beam Ps and control beam Pc, converged by focusing GRIN lens 25 and reflected by nonlinear etalon 33, are reflected by half-mirror 89 and incident on wavelength filter 91. Wavelength filter 91 transmits only signal beam Ps of wavelength $\lambda s$. As a result, reflected output beam Pr($\lambda s$), corresponding to signal beam Ps of wavelength $\lambda s$, is emitted from optical fiber 39.

Thus, in this embodiment 9, the unnecessary output component, i.e., control beam Pc, is also cut off by means of wave filter 91, and only reflected output beam Pr($\lambda s$) of wavelength $\lambda s$ is emitted, resulting in the same effects as embodiment 8 described above.

EMBODIMENT 10 (REFLECTING TYPE 4)

Figure 30:
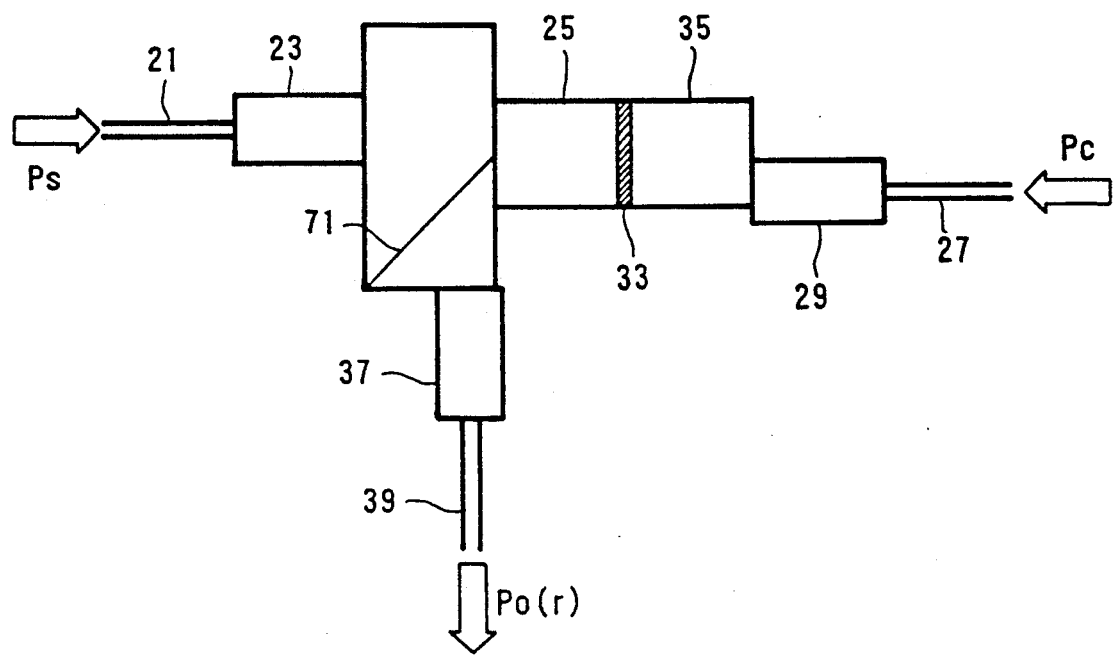
FIG. 30 is a side view showing a configuration of a reflecting-type all-optical switch according to embodiment 10 of the present invention.

FIG. 30 is a side view showing a configuration of a reflecting-type all-optical switch according to embodiment 10 of the present invention. The distinctive feature of embodiment 10 is that its components are arranged so that signal beam Ps is incident on the front surface of nonlinear etalon 33, whereas control beam Pc is incident on the back surface of nonlinear etalon 33. More specifically, signal beam Ps, as in embodiment 7 in FIG. 23, is focused onto the center of the front surface of nonlinear etalon 33, while control beam Pc, passing through optical fiber 27, collimated by collimating GRIN lens 29, is focused onto the center of the back surface of etalon 33 through focusing GRIN lens 35.

Figure 31:
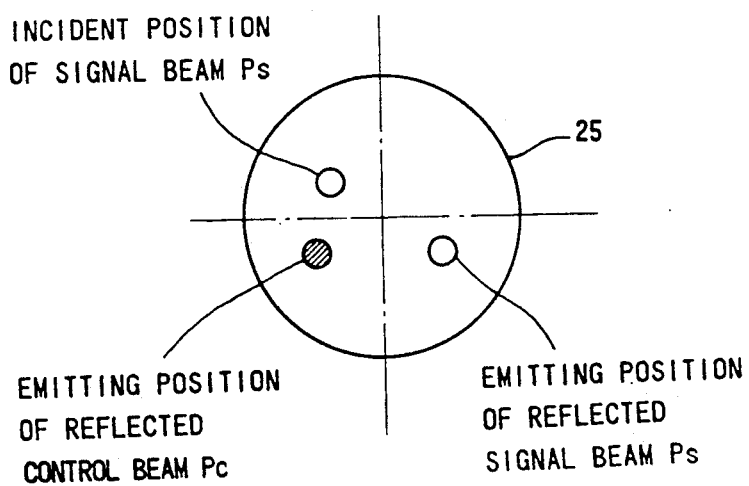
FIG. 31 is a sectional view showing the position of beam spots on the left-end surface of converging lens 25 of embodiment 10.

FIG. 31 is a sectional view showing the incident and emitted positions of signal beam Ps and the emitted position of control beam Pc on the left-end surface of focusing GRIN lens 25. FIG. 31 shows the left-end surface of focusing GRIN lens 25 seen from the left side of FIG. 30, and the top edge of the figure seen in FIG. 31, is also seen as the left-end surface of focusing GRIN lens 25 in FIG. 30. As shown in FIGS. 31 and 30, signal beam Ps, being incident on the upper side of the left-end surface of focusing GRIN lens 25, is reflected by nonlinear etalon 33 when control beam Pc is not incident, and the reflected beam Ps is emitted from the lower side of the left-end surface of focusing GRIN lens 25. In contrast, when control beam Pc is incident, both the signal beam Ps and control beam Pc passes through nonlinear etalon 33, so that signal beam Ps is emitted to the outside, and control beam Pc is emitted from the left-end surface of focusing GRIN lens 25. As a result, when control beam Pc is not incident, signal beam Ps reflected by nonlinear etalon 33 is once again reflected by mirror 71, incident on collimating GRIN lens 37, and emitted from optical fiber 39 as reflected output beam Po(r). On the other hand, when control beam Pc is incident, reflected output Po(r) is not emitted. Thus switching of signal beam Ps is accomplished.

EMBODIMENT 11 (MIRRORLESS TRANSMITTING TYPE)

FIG. 32 is a side view showing a configuration of a mirrorless-type all-optical switch according to embodiment 11 of the present invention. This embodiment 11 is arranged so that signal beam Ps and control beam Pc are directly incident on focusing GRIN lens 25. More specifically, signal beam Ps, passing through optical fiber 21 and collimated by collimating GRIN lens 23, is directly incident on the left-end surface of focusing GRIN lens 25. Similarly, control beam Pc, passing through optical fiber 27 and collimated by collimating GRIN lens 29, is directly incident on the left-end surface of focusing GRIN lens 25. These beams Ps and Pc are converged by focusing GRIN lens 25, and focused onto the center of the surface of etalon 33. Nonlinear etalon 33 transmits these beams Ps and Pc when control beam Pc is incident, and only signal beam Ps is sent into collimating GRIN lens 37 through focusing GRIN lens 35. Thus, signal beam Ps is incident on collimating GRIN lens 37, and is produced from optical fiber 39 as output beam Po. In this case, collimating GRIN lenses 23 and 29 must clearly be thinner than focusing GRIN lens 25.

The operation of embodiment 11 will be explained with reference to FIG. 9.

When control beam Pc is incident, signal beam Ps, together with control beam Pc, is transmitted through nonlinear etalon 33 with little attenuation, and converged by focusing GRIN lens 35. Then, only signal beam Ps passes through collimating GRIN lens 37, and is incident on optical fiber 39, from which signal beam Ps is emitted as output beam Po. In contrast, control beam Pc transmitted through nonlinear etalon 33 follows a path in focusing GRIN lens 35 different from that of signal beam Ps, and is emitted to the outside from the right-end surface of focusing GRIN lens 35.

In contrast, when control beam Pc is not incident, nonlinear etalon 33 is in a nontransmissive state, so that signal beam Ps is abruptly reflected therein, and so output beam Po is not emitted. Thus, signal beam Ps is turned on and off by control beam Pc.

In this embodiment 11, the positions of collimating GRIN lenses 23 and 29 placed at the input side of optical gate 40 are changeable on the left-end surface of focusing GRIN lens 25. Adjustment of the positions can change the angles of incidence of the beams Ps and Pc onto nonlinear etalon 33. This means, as is described in the explanation of embodiment 1, that the detuning of nonlinear etalon 33 is adjustable by regulating the positions of collimating GRIN lenses 23 and 29. As a result, detuning of signal beam Ps and control beam Pc can be individually controlled while maintaining the superposed focused positions on the center of the surface of nonlinear etalon 33. For this reason, signal beam Ps can be adjusted so that a large on/off ratio is obtained, while control beam Pc can be adjusted so that the operating power can be reduced. Thus, large on/off ratios and good switching operation can be achieved.

Although operation of embodiment 11 is similar to that of embodiment 1, a more compact arrangement with fewer components is achieved by embodiment 11.

EMBODIMENT 12 (MIRRORLESS REFLECTING TYPE)

FIG. 33 is a side view showing a configuration of a mirrorless-type all-optical switch according to embodiment 12 of the present invention. The all-optical switch of embodiment 12 is arranged so that signal beam Ps is reflected by optical gate 40a, and the switch of embodiment 12 operates as a complementary switch of the transmitting-type all-optical switch of embodiment 11 described above.

Optical gate 40a of this embodiment 12 is constructed by bonding on surface of nonlinear etalon 33 to the right-end surface of focusing GRIN lens 25. On the left-end surface of focusing GRIN lens 25, three fiber collimators are provided: first, a fiber collimator into which signal beam Ps is incident; second, a fiber collimator into which control beam Pc is incident; and third, a fiber collimator from which output beam Po is emitted. The fiber collimator for signal beam Ps is composed of optical fiber 21 and collimating GRIN lens 23, the fiber collimator for control beam Pc is composed of optical fiber 27 and collimating GRIN lens 29, and the fiber collimator for output beam Po is composed of optical fiber 39 and collimating GRIN lens 37.

Figure 34:
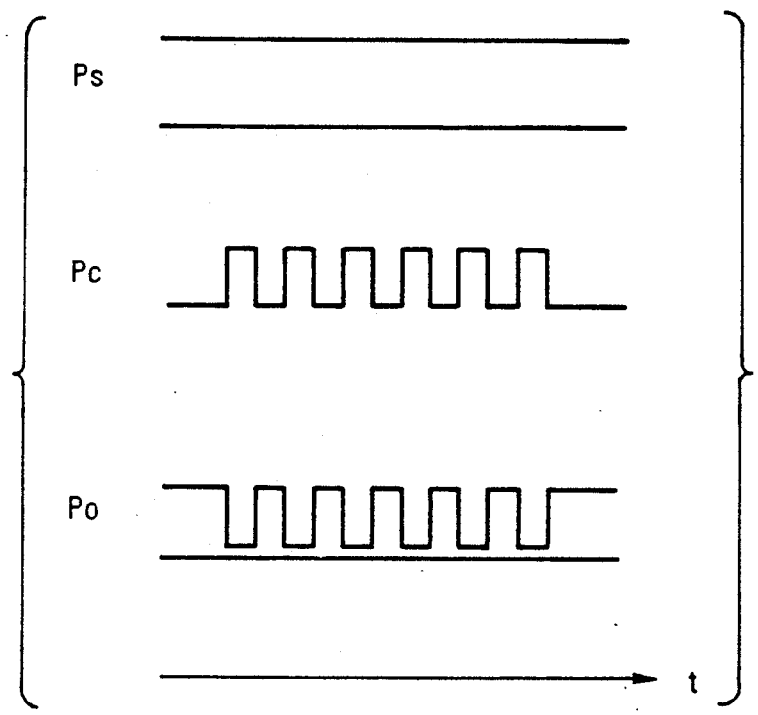
FIG. 34 is a timechart showing the operation of the all-optical switch of embodiment 12.

Operation of embodiment 12 will be explained with reference to FIG. 34.

A continuous signal beam Ps and a pulsed control beam Pc are incident on focusing GRIN lens 25 of optical gate 40a, and are focused onto the center of the surface of nonlinear etalon 33. When control beam Pc is not incident, signal beam Ps is reflected by nonlinear etalon 33 with little attenuation. Reflected signal beam Ps passes through focusing GRIN lens 25 along a path different from that of incident signal beam Ps, is incident on collimating GRIN lens 37, and is then emitted from optical fiber 39 as output beam Po.

In contrast, when control beam Pc is incident, signal beam Ps is not reflected by nonlinear etalon 33, so that output beam Po is not emitted.

EMBODIMENT 13 (TRANSFER TYPE 1)

Figure 35:
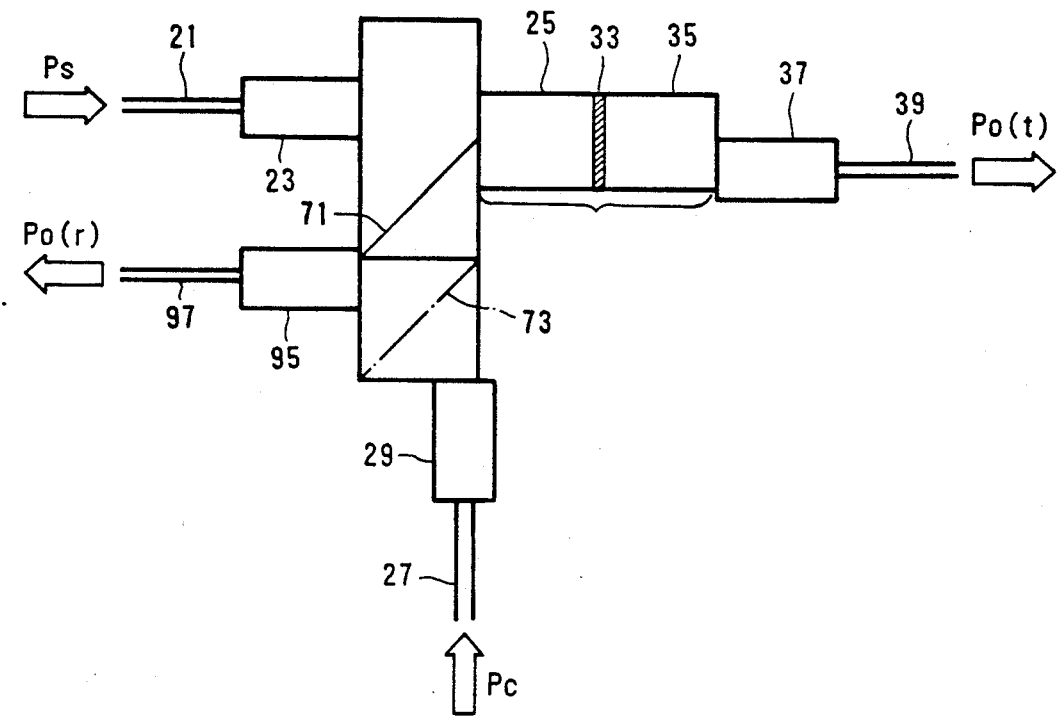
FIG. 35 is a side view showing a configuration of a transfer-type all-optical switch according to embodiment 13 of the present invention.

FIG. 35 is a side view showing a configuration of a transfer-type all-optical switch according to embodiment 13 of the present invention. This embodiment 7 has an arrangement in which an output portion of signal beam Ps that passes through nonlinear etalon 35 is added to the optical switch of embodiment shown in FIG. 23. More specifically, to the right surface of nonlinear etalon 33 is bonded focusing GRIN lens 35 which has a right-end surface in contact with a fiber collimator composed of collimating GRIN lens 37 and optical fiber 39.

Figure 36:
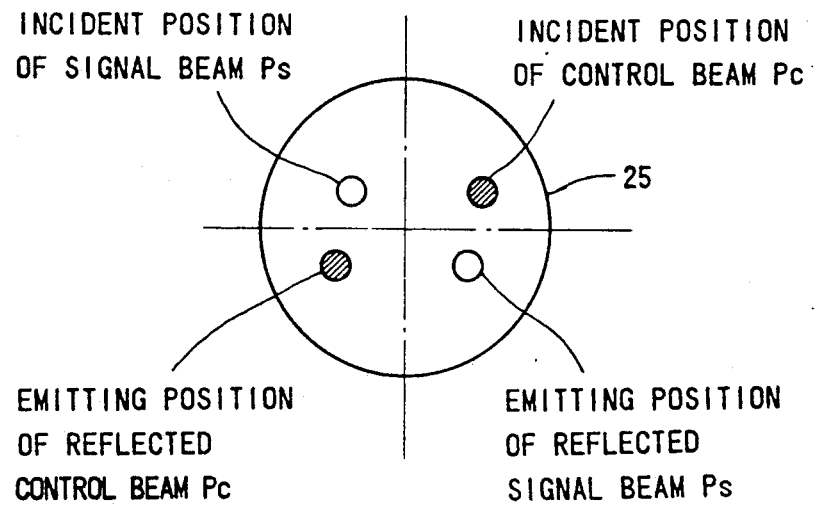
FIG. 36 is a sectional view showing the positions of beam spots on the left-end surface of converging lens 25 of embodiment 13.

FIG. 36 is a sectional view showing the incident and emitted positions of signal beam Ps and control beam Pc on the left-end surface of focusing GRIN lens 25. This FIG. 36 shows the left-end surface of focusing GRIN lens 25 seen from the left side of FIG. 35, and the top edge of the figure seen in FIG. 36 is also seen as the left-end surface of focusing GRIN lens 25 in FIG. 35. As shown in FIGS. 35 and 36, signal beam Ps, which is incident on the upper portion of the left-end surface of focusing GRIN lens 25, is emitted from the lower portion thereof, and control beam Pc, which is incident on the lower portion of the left-end surface, is emitted from the upper portion.

Figure 37:
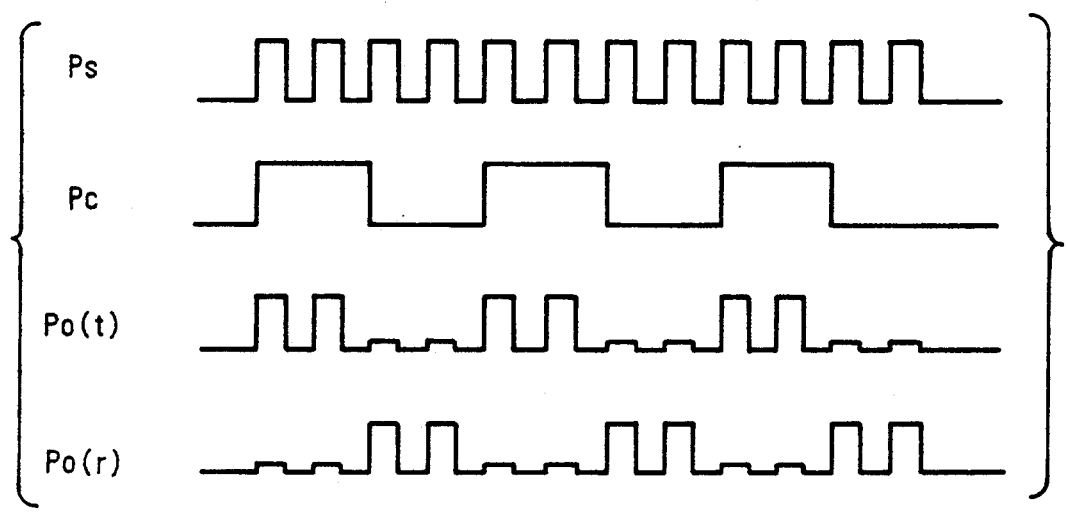
FIG. 37 is a timechart showing the operation of the all-optical switch of embodiment 13.

FIG. 37 is a timechart showing the operation of the all-optical switch of embodiment 13. When control beam Pc is incident, nonlinear etalon 33 transmits signal beam Ps. The transmitted signal beam Ps is converged by focusing GRIN lens 35 and collimating GRIN lens 37, and produced from optical fiber 39 as transmitting output Po(t).

On the other hand, when control beam Pc is not incident, nonlinear etalon 33 reflects signal beam Ps. The reflected signal beam Ps passes through focusing GRIN lens 25, mirror 71, partial mirror 73, collimating GRIN lens 95, and optical fiber 97. Then, signal beam Ps is emitted from optical fiber 97 as reflected output beam Po(r).

In this embodiment 13, the direction of signal beam Ps is transferred according to the presence or absence of control beam Pc: the switch of embodiment 13 operates as an optical directional switch. In addition, using an asymmetric nonlinear etalon in which the reflectance MRf of front mirror 43 and the reflectance MRb of back mirror 45 differs, makes it possible, just as in embodiment 7, to increase the on/off ratio of switching of the reflected beam, although that of the transmitted beam decreases slightly.

EMBODIMENT 14 (TRANSFER TYPE 2)

Figure 38:
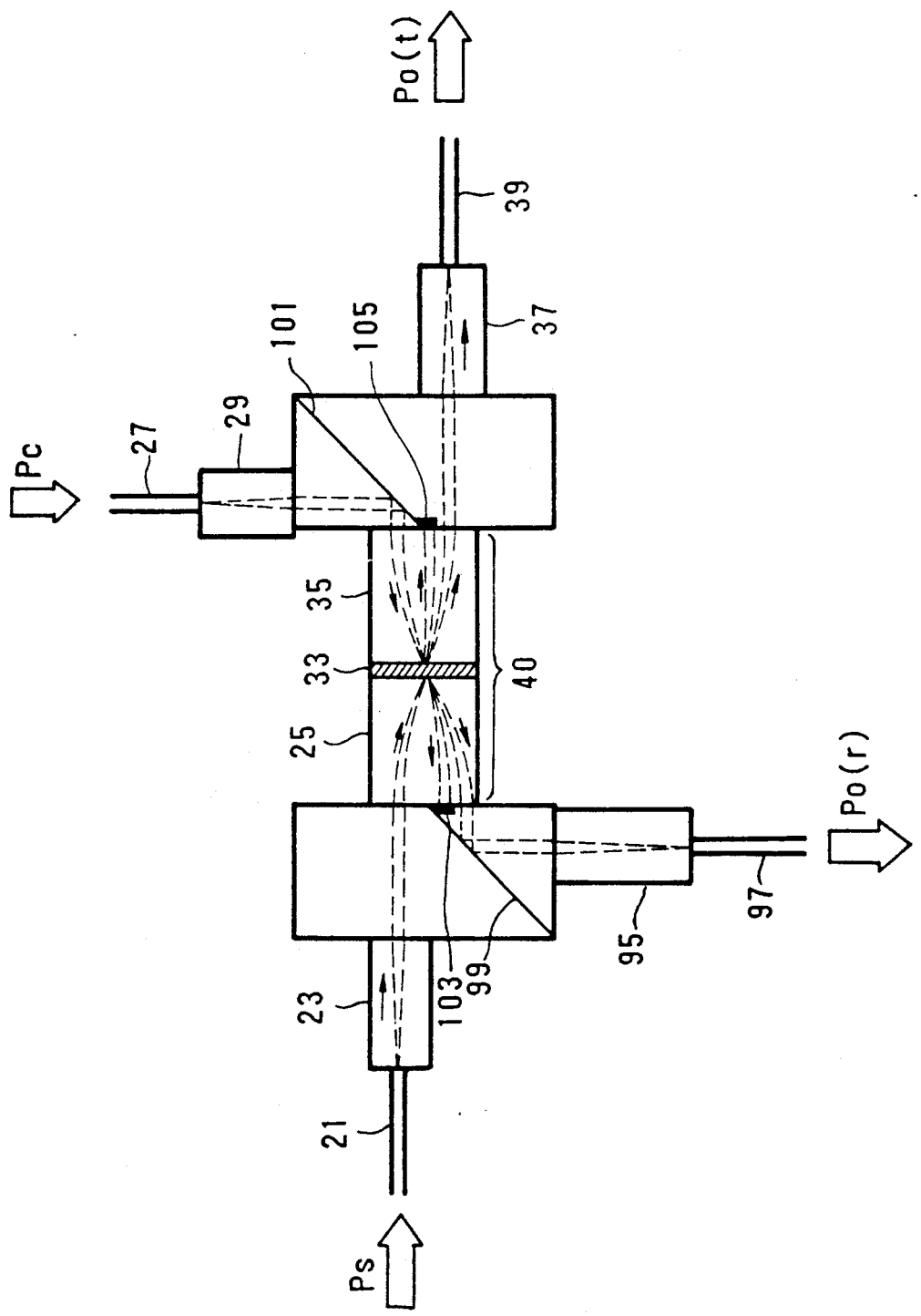
FIG. 38 is a side view showing a configuration of a transfer-type all-optical switch according to embodiment 14 of the present invention.

FIG. 38 is a side view showing a configuration of a transfer-type all-optical switch according to embodiment 14 of the present invention.

Signal beam Ps passing through optical fiber 21, collimated by collimating GRIN lens 23, and transmitted through the upper portion of mirror 99, is incident onto the center of front surface of nonlinear etalon 33 through focusing GRIN lens 25 of optical gate 40. The signal beam Ps reflected by the front surface of nonlinear etalon 33 is reflected again by mirror 99, passes through collimating GRIN lens 95, and is emitted from optical fiber 97 as reflected output Po(r). On the other hand, signal beam Ps, which is transmitted through nonlinear etalon 33, is collimated by focusing GRIN lens 35, passes through the lower portion of mirror 101 and collimating GRIN lens 37, and is emitted from optical fiber 39 as transmitting output Po(t).

In contrast, control beam Pc passing through optical fiber 27, collimated by collimating GRIN lens 29, is reflected by mirror 101 and is focused on the center of the back surface of nonlinear etalon 33 through focusing GRIN lens 35 of optical gate 40.

The arrangement described above is constructed so that the optical path of signal beam Ps reflected by nonlinear etalon 33 and the optical path of control beam Pc transmitted through nonlinear etalon 33 do not coincide with each other, and moreover, the optical path of signal beam Ps transmitted through nonlinear etalon 33, that of control beam Pc incident on nonlinear etalon 33, and that of control beam Pc reflected by nonlinear etalon 33, do not coincide with one another. In addition, screening plate 103 is provided close to mirror 99 in order to stop control beam Pc which is transmitted through nonlinear etalon 33. Similarly, screening plate 105 is provided close to mirror 101 in order to stop control beam Pc which is reflected by nonlinear etalon 33. Incidentally, nonlinear etalon 33 can be produced so as to be asymmetrical, i.e. the reflectance of mirror 43 of etalon 33 and the reflectance of mirror 45 can differ. For example, in the case where mirrors 43 and 45 are dielectric mirrors, these mirrors 43 and 45 are made asymmetric if the number of layers forming these mirrors differ. In the case where mirrors 43 and 45 are metal mirrors, they are made asymmetric by differing the constructions of the thin film layers. As described above, asymmetric nonlinear etalons generally present higher on/off ratios of switching than symmetric nonlinear etalons which have mirrors of the same reflectance.

Operation of embodiment 14 will be described with reference to the timingchart in FIG. 37. In FIG. 37, waveforms of signal beam Ps, control beam Pc, transmitted output beam Po(t), and reflected output beam Po(t) are shown.

When signal beam Ps, in the form of a train of pulses as shown in FIG. 37, is incident on optical fiber 21, signal beam Ps is transmitted along optical fiber 21, collimated by collimating GRIN lens 23, and is incident on nonlinear etalon 33 through focusing GRIN lens 25. When control beam Pc is not incident, since the intensity of incident beam Ps on nonlinear etalon 33 does not reach the threshold of nonlinear etalon 33, nonlinear etalon 33 is in a reflective state, and so signal beam Ps is reflected by nonlinear etalon 33. The reflected signal beam Ps is incident on mirror 99 through focusing GRIN lens 25, reflected by mirror 99, incident on optical fiber 97 through collimating GRIN lens 95, and is emitted from optical fiber 97 as reflected output beam Po(r).

In contrast, when control beam Pc is incident, control beam Pc, passing through optical fiber 27, and collimated by collimating GRIN lens 29, is incident on mirror 101. The control beam Pc reflected by mirror 101 is focused on the center of the back surface of nonlinear etalon 33 through focusing GRIN lens 35 of optical gate 40. In this case, the intensity of the incident beams Ps and Pc exceeds the threshold of nonlinear etalon 33, and so nonlinear etalon 33 becomes transmissive. Hence, signal beam Ps is transmitted through nonlinear etalon 33, is incident on collimating GRIN lens 37 through focusing GRIN lens 35, and is emitted from optical fiber 39 as transmitted output Po(t). Thus, either optical fibers 39 or 97 is selected as the waveguide from which signal beam Ps is emitted according to the presence or absence of control beam Pc.

In this embodiment 14, signal beam Ps and control beam Pc are also separated by means of optical off-axis arrangement. The optical off-axis arrangement includes focusing GRIN lenses 25 and 35, and collimating GRIN lenses 23 and 29. Each of focusing GRIN lenses 25 and 35, as described above, has a function so as to converge all the light rays which are incident on one end surface of lens 25 (or 35) in parallel to the axis, onto the center of the other end surface of the lens 25 (or 35). In addition, each of these lenses 25 and 35 has a gradient-index profile of a square distribution against its radius. The off-axis arrangement makes it possible to construct an optical system having a reduced optical power loss without using a polarization beam splitter or a quarter-wavelength plate. In addition, position adjustment of collimating GRIN lenses 23 and 29 has a relatively wide tolerance, and assembly of the components is easy, which facilitates the adjusting and setting of the lenses. This makes it possible to fine-tune the resonance wavelength of nonlinear etalon 33 by adjustment of incident positions of signal beam Ps and control beam Pc, and further, even to control the input-output characteristics of nonlinear etalon 33. Thus, the switching operation of the present invention can be performed more easily than in the conventional switching operation.

EMBODIMENT 15 (TRANSFER TYPE 3)

Figure 39:
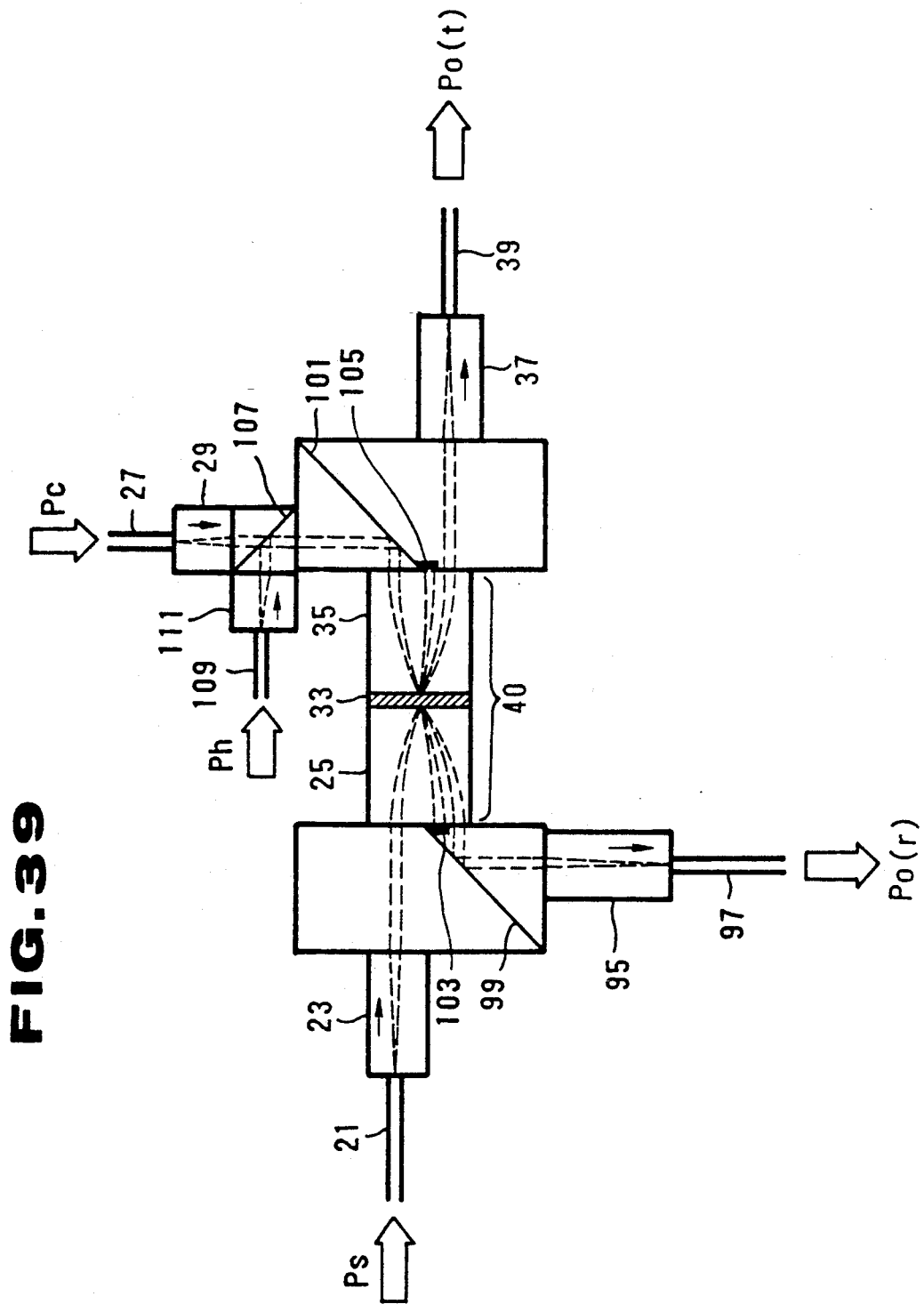
FIG. 39 is a side view showing a configuration of a transfer-type all-optical switch according to embodiment 15 of the present invention.

FIG. 39 is a side view showing a configuration of a transfer-type all-optical switch according to embodiment 15 of the present invention. This embodiment 15 differs from embodiment 14 in the following features: first, half-mirror 107 is provided between collimating GRIN lens 29 and mirror 101; second, holding beam Ph, passing through optical fiber 109, and collimated by collimating GRIN lens 111, is incident on half-mirror 107 so that holding beam Ph is combined with control beam Pc, and the combined beams are incident on mirror 101. Thus, the combined beams of control beam Pc and holding beam Ph are reflected together by mirror 101, and then focused onto the center of the back surface of nonlinear etalon 33 through focusing GRIN lens 35.

In this embodiment 15, the intensity level Psi of signal beam Ps, the intensity level Pci of control beam Pc, and the intensity level Phi of holding beam Ph are determined to satisfy the following conditions: first, the intensity level Psi must be less than the switch-down threshold PTH1 in FIG. 11; second, the intensity level Psi+Phi must be greater than the switch-down threshold PTH1 and less than the switch-up threshold PTH2; and moreover, the sum total Psi+Phi+Pci of the intensity level Psi of signal beam Ps, the intensity level Phi of holding beam Ph, and the intensity level Pci of control beam Pc must be greater than the switch-up threshold PTH2.

Figure 40:
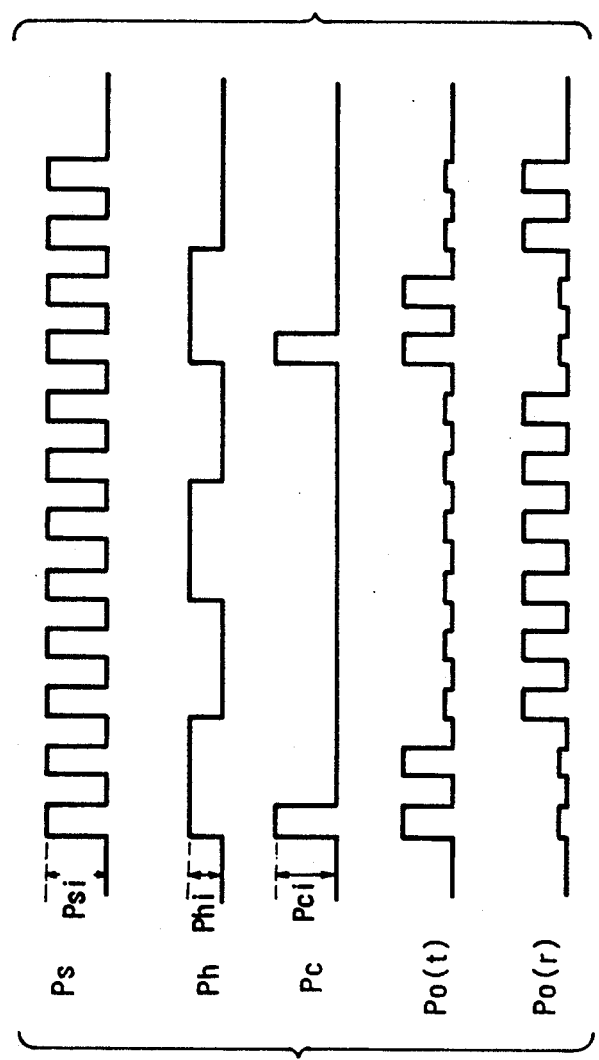
FIG. 40 is a timechart showing the operation of the all-optical switch of embodiment 15.

Next, referring to FIG. 40, operation of embodiment 15 will be described.

When holding beam Ph is not incident, operation of embodiment 15 is the same as that of embodiment 14: when both the signal beam Ps of level Psi and control beam Pc of level Pci are incident on nonlinear etalon 33, nonlinear etalon 33 is in a high transmission state so that signal beam Ps is emitted from optical fiber 39 as transmitted output beam Po(t).

The incidence of holding beam Ph of level Phi on nonlinear etalon 33 when both beams Ps and Pc are incident, makes it possible for nonlinear etalon 33 to maintain the high transmission state after control beam Pc is no longer incident. As a result, signal beam Ps is emitted from optical fiber 39 as transmitted output beam Po(t) as long as holding beam Ph is incident, even after the removal of control beam Pc. After that, when the incidence of holding beam Ph is removed, nonlinear etalon 33 changes its state from a high transmission state to a low transmission state (high reflectance state). Hence, signal beam Ps is emitted from optical fiber 97 as reflected output beam Po(r) until the control beam Pc is next incident. Thus, holding beam Ph maintains the previous state after control beam Pc is extinguished. In other words, a switching operation having a memory function is possible.

Applying optical switches having a memory function to practical systems has a great advantage, because pulsed control beam Pc is often used to switch the waveguides of signal beam Ps in practical systems.

EMBODIMENT 16 (TRANSFER TYPE 4)

Figure 41:
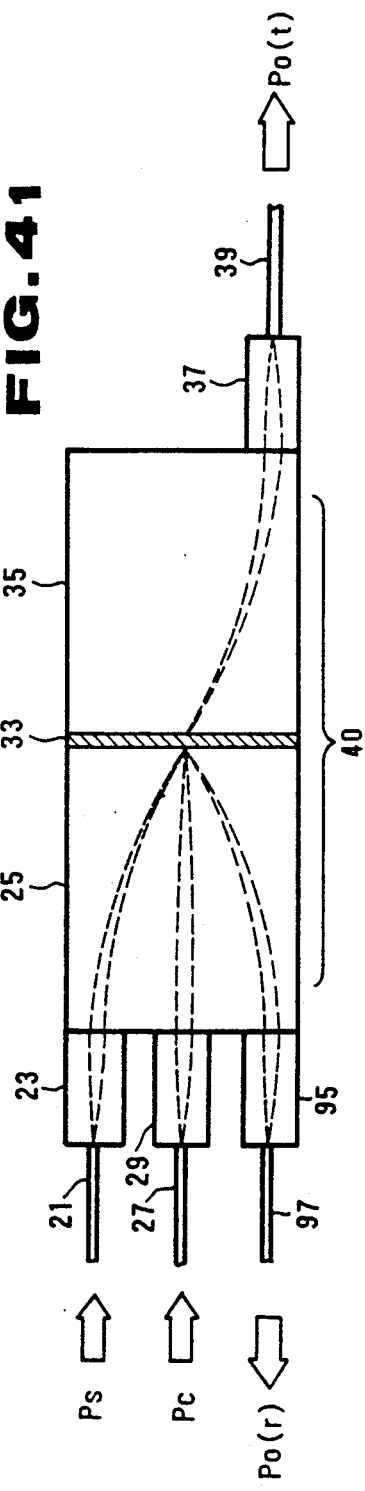
FIG. 41 is a side view showing a configuration of a transfer-type all-optical switch according to embodiment 16 of the present invention.

FIG. 41 is a side view showing a configuration of a transfer-type all-optical switch according to embodiment 16 of the present invention. The optical switch of this embodiment 16 has an arrangement in which an output portion of signal beam Ps that passes through nonlinear etalon 33 is added to the optical switch of embodiment 12 shown in FIG. 33. More specifically, to the right surface of nonlinear etalon 33 is bonded focusing GRIN lens 25 whose right-end surface makes contact with a fiber collimator composed of collimating GRIN lens 37 and optical fiber 39.

Operation of this embodiment 16 is similar to that of embodiment 14 described above: either optical fiber 39 or 97 is selected as the waveguide from which signal beam Ps is emitted depending on the presence or absence of control beam Pc. Furthermore, when an asymmetric type nonlinear etalon is used as nonlinear etalon 33, the reflectance of mirror 43 differs from the reflectance of mirror 45 of nonlinear etalon 33. Hence, the threshold of a surface of nonlinear etalon 33 is greater than the threshold of the other surface of nonlinear etalon 33. As a result, the incidence of signal beam Ps and control beam Pc on the surface of nonlinear etalon 33, having the lower threshold, reduces the threshold of the switching operation, thus reducing the required intensity levels of signal beam Ps and control beam Pc.

Although specific embodiments of all-optical switch apparatuses using a nonlinear etalon assembled in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An all-optical switch apparatus using a nonlinear etalon, said all-optical switch apparatus turning a signal beam on and off under the control of a control beam, said all-optical switch apparatus comprising:
   optical gate means having a nonlinear etalon and a pair of lensing means attached to each surface of said etalon, said etalon having a nonlinear transmittance that changes in response to the intensity of incident light, each of said lensing means converging rays of light which are parallel to the axis of the lensing means and are incident on one end surface of the lensing means so that the rays of light converged by said lensing means converge on the center of an opposite end surface of the lensing means;
   optical input means for sending said signal beam and said control beam into said optical gate means such that said signal beam and said control beam are sent to different incident positions, the positions of said different incident positions being asymmetrical to the axis of said optical gate means, on one end surface of said optical gate means in an orientation substantially parallel to the axis thereof without overlapping the axis thereof; and optical output means for separating said signal beam from said control beam using the difference in emitted positions of said signal beam and said control beam from said optical gate means, and for emitting only said signal beam as an output beam.

2. An all-optical switch apparatus using a nonlinear etalon according to claim 1, wherein said optical input means has primary collimating means that collimates said signal beam, secondary collimating means that collimates said control beam, optical guide means that sends said signal beam and said control beam emitted from each of said collimating means into said optical gate means, and adjusting means for adjusting the positions of said primary and secondary collimating means so that said incident positions of said signal beam and said control beam onto said optical gate means can be varied; and said optical output means has output lensing means that converges said signal beam emitted from said optical gate means to be outputted to the outside.

3. An all-optical switch apparatus using a nonlinear etalon according to claim 1, wherein said optical input means has primary collimating means that collimates said signal beam, laser means that produces said control beam, secondary collimating means that collimates said control beam produced from said laser means, mirror prism that sends said signal beam and said control beam emitted from each of said collimating mean into said optical gate means, and adjusting means for adjusting the positions of said primary and secondary collimating means so that said incident positions of said signal beam and said control beam onto said optical gate means can be varied; and said optical output means has output lensing means that converges said signal beam emitted from said optical gate means to be outputted to the outside.

4. An all-optical switch apparatus using a nonlinear etalon according to claim 1, wherein said optical input means has primary collimating means that collimates said signal beam, secondary collimating means that collimates said control beam of a wavelength different from that of said signal beam, a primary dichroic mirror that sends said signal beam and said control beam emitted from each of said collimating means into said optical gate means, and adjusting means for adjusting the positions of said primary and secondary collimating means so that said incident positions of said signal beam and said control beam onto said optical gate means can be varied; and said optical output means has a secondary dichroic mirror that separates said signal beam from said control beam emitted from said optical gate means by using the difference in said wavelengths, and output lensing means that converges said separated signal beam to be outputted to the outside.

5. An all-optical switch apparatus using a nonlinear etalon according to claim 1, wherein said optical input means has primary collimating means that collimates said signal beam, secondary collimating means that collimates said control beam of a wavelength different from that of said signal beam, a primary dichroic mirror that sends said signal beam and said control beam emitted from each of said collimating means into said optical gate means, and adjusting means for adjusting the positions of said primary and secondary collimating means so that said incident positions of said signal beam and said control beam onto said optical gate means can be varied; and said optical output means has a wavelength-filter that separates said signal beam from said control beam emitted from said optical gate means by using the difference in said wavelengths, and output lensing means that converges said separated signal beam to be outputted to the outside.

6. An all-optical switch apparatus using a nonlinear etalon according to claim 1, wherein said optical input means has primary collimating means that collimates said signal beam, secondary collimating means that collimates said control beam, a primary polarization beam splitter that converts said signal beam and said control beam into two orthogonal linearly polarized beams and sends the polarized beams into said optical gate means, and adjusting means for adjusting the positions of said primary and secondary collimating means so that said incident positions of said signal beam and said control beam onto said optical gate means can be varied; and said optical output means has a secondary polarization beam splitter that separates said signal beam from said control beam emitted from said optical gate means by using the difference in the planes of polarization, and output lensing means that converges said separated signal beam to be outputted to the outside.

7. An all-optical switch apparatus using a nonlinear etalon according to claim 1, wherein said optical input means has primary collimating means that collimates said signal beam, secondary collimating means that collimates said control beam, a primary polarization beam splitter that converts said signal beam and said control beam into two orthogonal linearly polarized beams and sends the polarized beams into said optical gate means, and adjusting means for adjusting the positions of said primary and secondary collimating means so that said incident positions of said signal beam and said control beam onto said optical gate means can be varied; and said optical output means has an analyzer that separates said signal beam from said control beam emitted from said optical gate means by using the difference in the planes of polarization, and output lensing means that converges said separated signal beam to be outputted to the outside.

8. An all-optical switch apparatus using a nonlinear etalon, said all-optical switch apparatus turning a signal beam on and off under the control of a control beam, said all-optical switch apparatus comprising:

optical gate means having a nonlinear etalon and lensing means attached to one surface of said etalon, said etalon having a nonlinear reflectance that changes in response to the intensity of incident light, said lensing means converging rays of light which are parallel to the axis of said lensing means and are incidental on one end surface of said lensing means so that the rays of light converged by said lensing means converge on the center of an opposite end surface of said lensing means;

optical input means for sending said signal beam and said control beam into said optical gate means such that said signal beam and said control beam are sent to different incident positions, the positions of said different incident positions being asymmetrical to the axis of said optical gate means, on one end surface of said optical gate means in an orientation substantially parallel to the axis there of without overlapping the axis thereof; and optical output means for separating said signal beam from said control beam, both of which are reflected by said nonlinear etalon and emitted from said optical gate means, by using the difference in emitted positions of said signal beam and said control beam from said optical gate means, and for emitting only said separated signal beam as an output beam.

9. An all-optical switch apparatus using a nonlinear etalon according to claim 8, wherein said optical input means has primary collimating means that collimates said signal beam, secondary collimating means that collimates said control beam, primary optical guide means that sends said signal beam and said control beam emitted from each of said collimating means into said optical gate means, and adjusting means for adjusting the positions of said primary and secondary collimating means so that said incident positions of said signal beam and said control beam onto said optical gate means can be varied; and said optical output means has secondary guide means that separates said signal beam from said control beam by using the difference in emitted positions from said optical gate means, and output lensing means that converges said separated signal beam to be outputted to the outside.

10. An all-optical switch apparatus using a nonlinear etalon according to claim 8, wherein said optical input means has primary collimating means that collimates said signal beam, secondary collimating means that collimates said control beam, two optical isolating means, one of which is attached to primary collimating means, and the other of which is attached to secondary collimating means, polarization beam splitter that converts said signal beam and said control beam emitted from each of said optical isolating means into two orthogonal linearly polarized beams, a quarter-wavelength plate sending said polarized beams into said optical gate means, and adjusting means for adjusting the positions of said primary and secondary collimating means so that said incident positions of said signal beam and said control beam onto said optical gate means can be varied; and said optical output means has a half-mirror that reflects said signal beam which is reflected by said optical gate means, passing through said quarter-wavelength plate and separated by said polarization beam splitter from said control beam by using the difference in the planes of polarization, and has output lensing means that converges said separated signal beam to be outputted to the outside.

11. An all-optical switch apparatus using a nonlinear etalon according to claim 8, wherein said optical input means has primary collimating means that collimates said signal beam, secondary collimating means that collimates said control beam of a wavelength different from that of said signal beam, a dichroic mirror that combines said signal beam and said control beam emitted from each of said collimating means, an optical isolator attached to said dichroic mirror, a half-mirror that sends said signal beam and said control beam emitted from said optical isolator into said optical gate means, and adjusting means for adjusting the positions of said primary and secondary collimating means so that said incident positions of said signal beam and said control beam onto said optical gate means can be varied; and said optical output means has a wavelength filter that separates said signal beam which is reflected by said optical gate means and passing through said half-mirror from said control beam by using the difference in said wavelengths, and output lensing means that converges said separated signal beam to be outputted to the outside.

12. An all-optical switch apparatus using a nonlinear etalon according to claim 8, wherein a pair of mirrors provided at both sides of said nonlinear etalon have different reflectances.

13. An all-optical switch apparatus using a nonlinear etalon, said all-optical switch apparatus turning a signal beam on and off under the control of a control beam, said all-optical switch apparatus comprising:

optical gate means having a nonlinear etalon and a pair of lensing means attached to each surface of said etalon, said etalon having a nonlinear reflectance that changes in response to the intensity of incident light, each of said lensing means converging rays of light which are parallel to the axis of the lensing means and are incident on one end surface of the lensing means so that the rays of light converged by said lensing means converge on the center of an opposite end surface of the lensing means;

optical input means including primary optical input means and secondary optical input means, said primary optical input means sending said control beam onto one end surface of said optical gate means in an orientation substantially parallel to the axis of said optical gate means without overlapping the axis thereof, said secondary optical input means sending said signal beam onto another end surface of said optical gate means in an orientation substantially parallel to the axis of said optical gate means without overlapping the axis thereof, and such that said signal beam and said control beam are sent to incident positions on the respective end surfaces, the positions of said incident positions being asymmetrical to the axis of said optical gate means; and optical output means separating said signal beam reflected by said nonlinear etalon and emitted from said optical gate means from said control beam transmitted through said nonlinear etalon and emitted from said optical gate means using the difference in emitted positions of said signal beam and said control beam from said optical gate means, and emitting only said separated signal beam as an output beam.

14. An all-optical switch apparatus using a nonlinear etalon according to claim 13, wherein said primary optical input means has primary collimating means that collimates said signal beam;

said secondary optical input means has secondary collimating means that collimates said signal beam;

said optical output means has a mirror that reflects said signal beam emitted from said optical gate means, and output lensing means that converges said reflected signal beam to be outputted to the outside.

15. An all-optical switch apparatus using a nonlinear etalon, said all-optical switch apparatus changing the direction of travel of a signal beam under the control of a control beam, said all-optical switch apparatus comprising:

optical gate means having a nonlinear etalon and a pair of lensing means attached to each surface of said etalon, said etalon having a nonlinear transmittance that changes in response to the intensity of incident light, each of said lensing means converging rays of light which are parallel to the axis of the lensing means and are incident on one end surface of the lensing means so that the rays of light converged by said lensing means converge on the center of an opposite end surface of the lensing means;

optical input means for sending said signal beam and said control beam into said optical gate means such that said signal beam and said control beam are sent to different incident positions, the positions of said different incident positions being asymmetrical to the axis of said optical gate means, on one end surface of said optical gate means in an orientation substantially parallel to the axis thereof without overlapping the axis thereof;

primary optical output means for separating said signal beam from said control beam, both of which are transmitted through said nonlinear etalon and emitted from said optical gate means, by using the difference in emitted positions of said signal beam and said control beam from said optical gate means, and for emitting only said separated signal beam as output beam; and secondary optical output means for separating said signal beam from said control beam, both of which are reflected by said nonlinear etalon and emitted from said optical gate means, by using the difference in emitted positions of said signal beam and said control beam from said optical gate means, and for emitting only said separated signal beam as output beam.

16. An all-optical switch apparatus using a nonlinear etalon according to claim 15, wherein said optical input means has primary collimating means that collimates said signal beam, secondary collimating means that collimates said control beam, primary optical guide means that sends said signal beam and said control beam emitted from each of said collimating means into said optical gate means, and adjusting means for adjusting the positions of said primary and secondary collimating means so that said incident positions of said signal beam and said control beam onto said optical gate means can be varied;

said primary optical output means has output lensing means that separates said signal beam transmitted through said optical gate means from said control beam by using the difference in emitted positions from said optical gate means, and converges said separated signal beam to be outputted to the outside; and said secondary optical output means has secondary optical guide means that separates said signal beam reflected by said optical gate means from said control beam by using the difference in emitted positions from said optical gate means, and output lensing means that converges said separated signal beam to be outputted to the outside.

17. An all-optical switch apparatus using a nonlinear etalon according to claim 15, wherein said optical input means has primary collimating means that collimates said signal beam, secondary collimating means that collimates said control beam, primary and secondary optical guide means that sends said signal beam and said control beam emitted from each of said collimating means into said optical gate means from the opposite ends of said optical gate means, and adjusting means for adjusting the positions of said primary and secondary collimating means so that said incident positions of said signal beam and said control beam onto said optical gate means can be varied;

said primary optical output means has output lensing means that separates said signal beam transmitted through said optical gate means from said control beam by using the difference in emitted positions from said optical gate means, and converges said separated signal beam to be outputted to the outside; and said secondary optical output means has a mirror that separates said signal beam reflected by said optical gate means from said control beam by using the difference in emitted positions from said optical gate means, and output lensing means that converges said separated signal beam to be outputted to the outside.

18. An all-optical switch apparatus using a nonlinear etalon according to claim 17, wherein said control beam is incident on said nonlinear etalon being combined with a holding beam that maintains the transmission state of said nonlinear etalon.

19. An all-optical switch apparatus using a nonlinear etalon according to claim 15, wherein said optical input means has primary collimating means that collimates said signal beam, secondary collimating means that collimates said control beam, and adjusting means for adjusting the positions of said primary and secondary collimating means so that said incident positions of said signal beam and said control beam onto said optical gate means can be varied;

said primary optical output means has primary output lensing means that separates said signal beam transmitted through said optical gate means from said control beam by using the difference in emitted positions from said optical gate means, and converges said separated signal beam to be outputted to the outside; and said secondary optical output means has secondary output lensing means that separates said signal beam reflected by said optical gate means from said control beam by using the difference in emitted positions from said optical gate means, and converges said separated signal beam to be outputted to the outside.

20. An all-optical switch apparatus using a nonlinear etalon according to claim 15, wherein a pair of mirrors provided at both sides of said nonlinear etalon have different reflectances.

* * * * *